(12) United States Patent
Shim et al.

(10) Patent No.: US 11,497,006 B2
(45) Date of Patent: Nov. 8, 2022

(54) COVERAGE ENHANCEMENT

(71) Applicant: LG Electronics Inc., Seoul (KR)

(72) Inventors: Jaenam Shim, Seoul (KR); Hyunsoo Ko, Seoul (KR); Suckchel Yang, Seoul (KR); Hyangsun You, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/576,554

(22) Filed: Jan. 14, 2022

(65) Prior Publication Data
US 2022/0225322 A1    Jul. 14, 2022

(30) Foreign Application Priority Data

| Jan. 14, 2021 | (KR) | .................. | KR10-2021-0005296 |
| Jan. 18, 2021 | (KR) | .................. | KR10-2021-0006879 |
| Apr. 14, 2021 | (KR) | .................. | KR10-2021-0048451 |
| May 12, 2021 | (KR) | .................. | KR10-2021-0061174 |
| Sep. 8, 2021 | (KR) | .................. | KR10-2021-0119897 |
| Nov. 5, 2021 | (KR) | .................. | KR10-2021-0151570 |

(51) Int. Cl.
| H04W 4/00 | (2018.01) |
| H04W 72/04 | (2009.01) |
| H04L 5/00 | (2006.01) |
| H04L 1/08 | (2006.01) |
| H04W 56/00 | (2009.01) |

(52) U.S. Cl.
CPC ........... *H04W 72/0413* (2013.01); *H04L 1/08* (2013.01); *H04L 5/0051* (2013.01); *H04W 56/005* (2013.01); *H04W 72/0446* (2013.01)

(58) Field of Classification Search
CPC ........... H04W 72/0413; H04W 56/005; H04W 72/0446; H04L 1/08; H04L 5/0051
USPC ......................................................... 370/329
See application file for complete search history.

(56) References Cited

U.S. PATENT DOCUMENTS

| 10,749,640 B2 | 8/2020 | Kim et al. | |
| 2013/0136071 A1* | 5/2013 | Han .................... | H04L 27/2636 370/329 |
| 2020/0351844 A1* | 11/2020 | Rico Alvarino ........ | H04L 1/189 |

OTHER PUBLICATIONS

Ericsson, "Analysis of Uplink Transmit Timing in NB-IoT," 3GPP TSG RAN WG4 Meeting #78bis, R4-161945, San José del Cabo, Mexico, Apr. 11-15, 2016, 7 pages.
PCT International Search Report in International Application No. PCT/KR2022/000745, dated May 3, 2022, 8 pages (with English translation).
Qualcomm Incorporated, "Potential coverage enhancement techniques for PUSCH," 3GPP TSG-RAN WG1 Meeting #103e, RI-2009729, e-Meeting, Oct. 26 -Nov. 13, 2020, 14 pages.

(Continued)

*Primary Examiner* — Mang Hang Yeung
(74) *Attorney, Agent, or Firm* — Fish & Richardson P.C.

(57) ABSTRACT

The present disclosure proposes various methods for improving coverage. According to an embodiment of the present disclosure, when an unavailable resource exists in a resource set configured for repeated transmission of a physical uplink channel, the UE may determine a resource capable of actually performing repeated transmission of a physical uplink channel within the resource set. According to another embodiment of th present disclosure, when the terminal receives the TPC command within the resource corresponding to the DMRS bundle, the terminal may perform power control based on the TPC command after the resource.

10 Claims, 24 Drawing Sheets

(56) References Cited

OTHER PUBLICATIONS

Vivo, "Views on WID scope for Rel-17 coverage enhancements," 3GPP TSG-RAN Meeting #90-e, RP-202638, Electronic Meeting, Dec. 7-11, 2020, 5 pages.
ZTE, "Support for transmission in preconfigured UL resources for MTC," 3GPP TSG RAN WG1 Meeting #98, R1-1908256, Prague, CZ, Aug. 26-30, 2019, 14 pages.

* cited by examiner

COVERAGE ENHANCEMENT

CROSS-REFERENCE TO RELATED APPLICATIONS

Pursuant to 35 U.S.C. § 119 (a), this application claims the benefit of Korean Patent Application No. 10-2021-0005296 filed on Jan. 14, 2021, No. 10-2021-0006879 filed on Jan. 18, 2021, No. 10-2021-0048451 filed on Apr. 14, 2021, No. 10-2021-0061174 filed on May 12, 2021, No. 10-2021-0119897 filed on Sep. 8, 2021 and No. 10-2021-0151570 filed on Nov. 5, 2021, the contents of which are all hereby incorporated by reference herein in their entirety.

BACKGROUNDS

Field of the Disclosure

The present disclosure relates to wireless communication.

Related Art

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

In the next-generation wireless communication system, there is ongoing discussion on coverage enhancement (CE) for an uplink signal with respect to a physical uplink shared channel (PUSCH), a physical uplink control channel (PUCCH), and other signals. Regarding the CE, there is ongoing discussion on a demodulation reference signal (DMRS) bundle in the PUSCH and PUCCH and a method of performing PUCCH/PUSCH repetition.

SUMMARY

The present specification proposes various coverage enhancement (CE) methods. Specifically, the present specification proposes an uplink power control method of a demodulation reference signal (DMRS) bundle, a power allocation and collision handling method of the DMRS bundle, an uplink power control method of the DMRS bundle according to user equipment (UE) capability, and a method of applying a timing advance (TA) command of the DMRS bundle.

According to the present specification, it is possible to resolve misunderstandings between a UE and a base station (BS) with respect to uplink transmission for CE. Therefore, it is possible to increase CE efficiency through various CE methods proposed in the present specification.

The effects that can be obtained through specific examples of the present disclosure are not limited to the effects listed above. For example, there may be various technical effects that a person having ordinary skill in the related art can understand or derive from the present disclosure. Accordingly, specific effects of the present disclosure are not limited to those explicitly described in the present disclosure and may include various effects that can be understood or derived from the technical features of the present disclosure.

BRIEF DESCRIPTION OF THE DRAWINGS

The following drawings are provided to describe specific examples of the present specification. A name of a specific device or a name of a specific signal/message/field disclosed in the drawings is proposed for exemplary purposes, and technical features of the present specification are not limited to the specific name used in the following drawings.

DESCRIPTION OF EXEMPLARY EMBODIMENTS

As used herein, "A or B" may mean "only A", "only B", or "both A and B". That is, "A or B" may be interpreted as "A and/or B" herein. For example, "A, B or C" may mean "only A", "only B", "only C", or "any combination of A, B, and C".

As used herein, a slash (/) or a comma (,) may mean "and/or". For example, "A/B" may mean "A and/or B".

Therefore, "A/B" may include "only A", "only B", or "both A and B". For example, "A, B, C" may mean "A, B, or C".

As used herein, "at least one of A and B" may mean "only A", "only B", or "both A and B". Further, as used herein, "at least one of A or B" or "at least one of A and/or B" may be interpreted equally as "at least one of A and B".

As used herein, "at least one of A, B, and C" may mean "only A", "only B", "only C", or "any combination of A, B, and C". Further, "at least one of A, B, or C" or "at least one of A, B, and/or C" may mean "at least one of A, B, and C".

As used herein, parentheses may mean "for example". For instance, the expression "control information (PDCCH)" may mean that a PDCCH is proposed as an example of control information. That is, control information is not limited to a PDCCH, but a PDCCH is proposed as an example of control information. Further, the expression "control information (i.e., a PDCCH)" may also mean that a PDCCH is proposed as an example of control information.

In the present disclosure, technical features that are individually described within one figure may be implemented individually or may be implemented at the same time.

Figure 1:
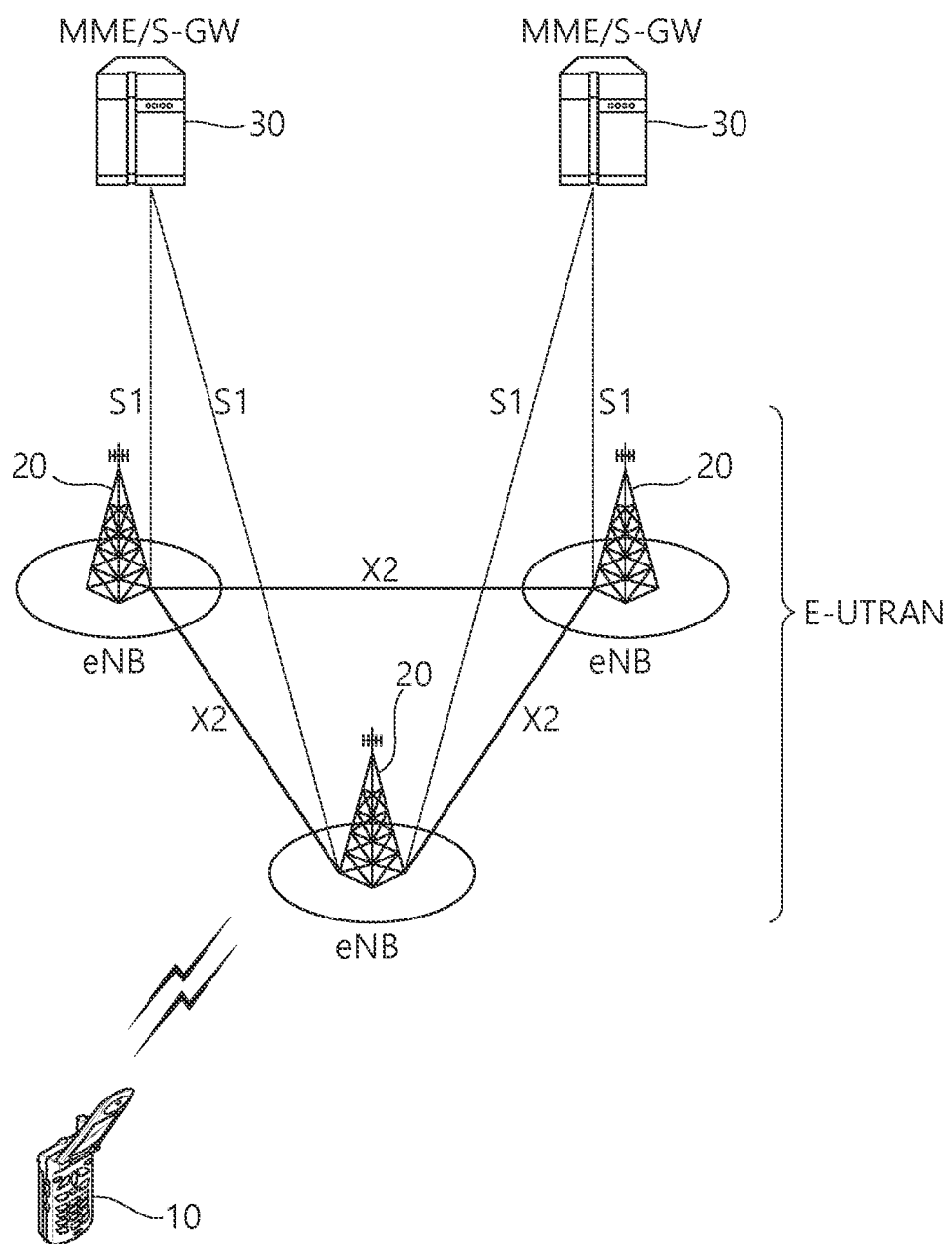
FIG. 1 shows a wireless communication system to which the present disclosure may be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
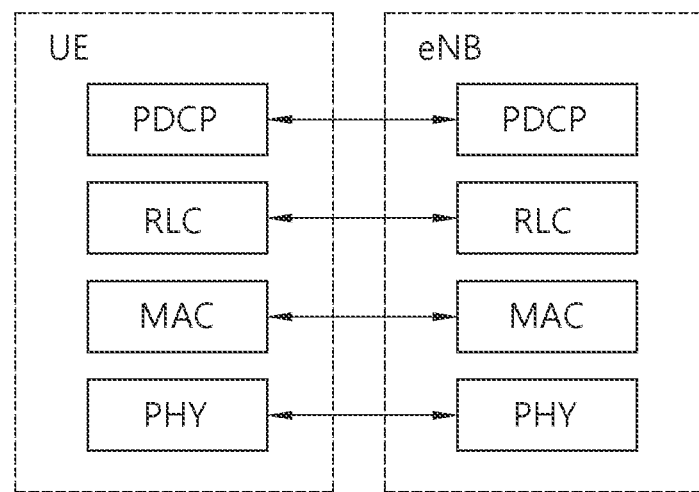
FIG. 2 is a diagram showing a wireless protocol architecture for a user plane.
Figure 3:
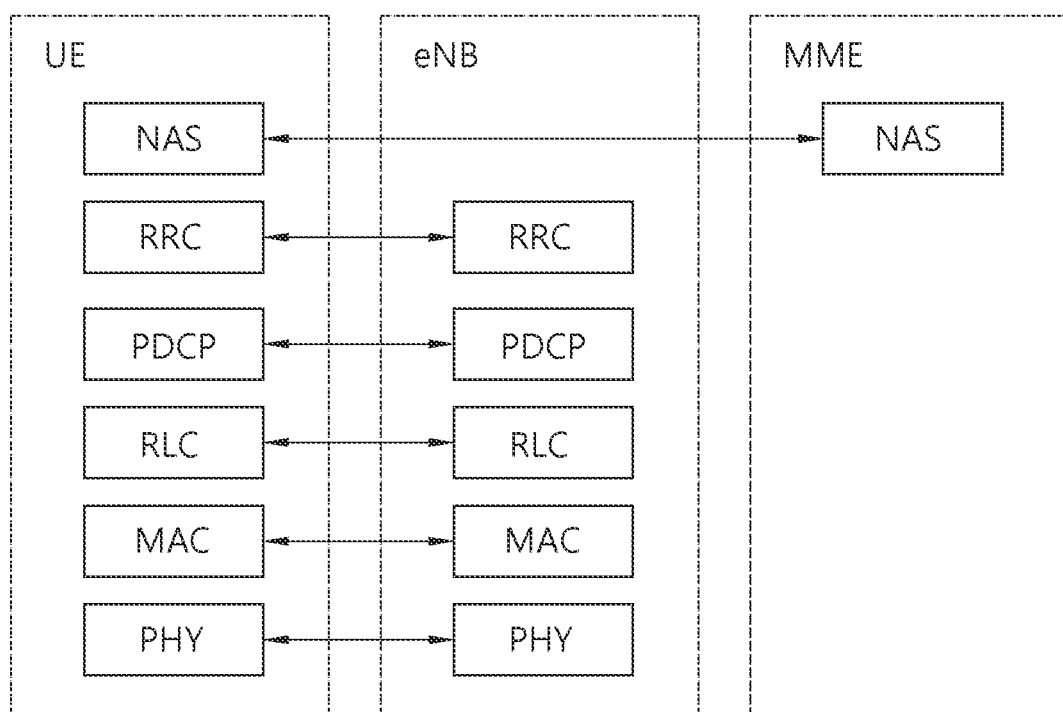
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for transmission, e.g., a subframe or a slot.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
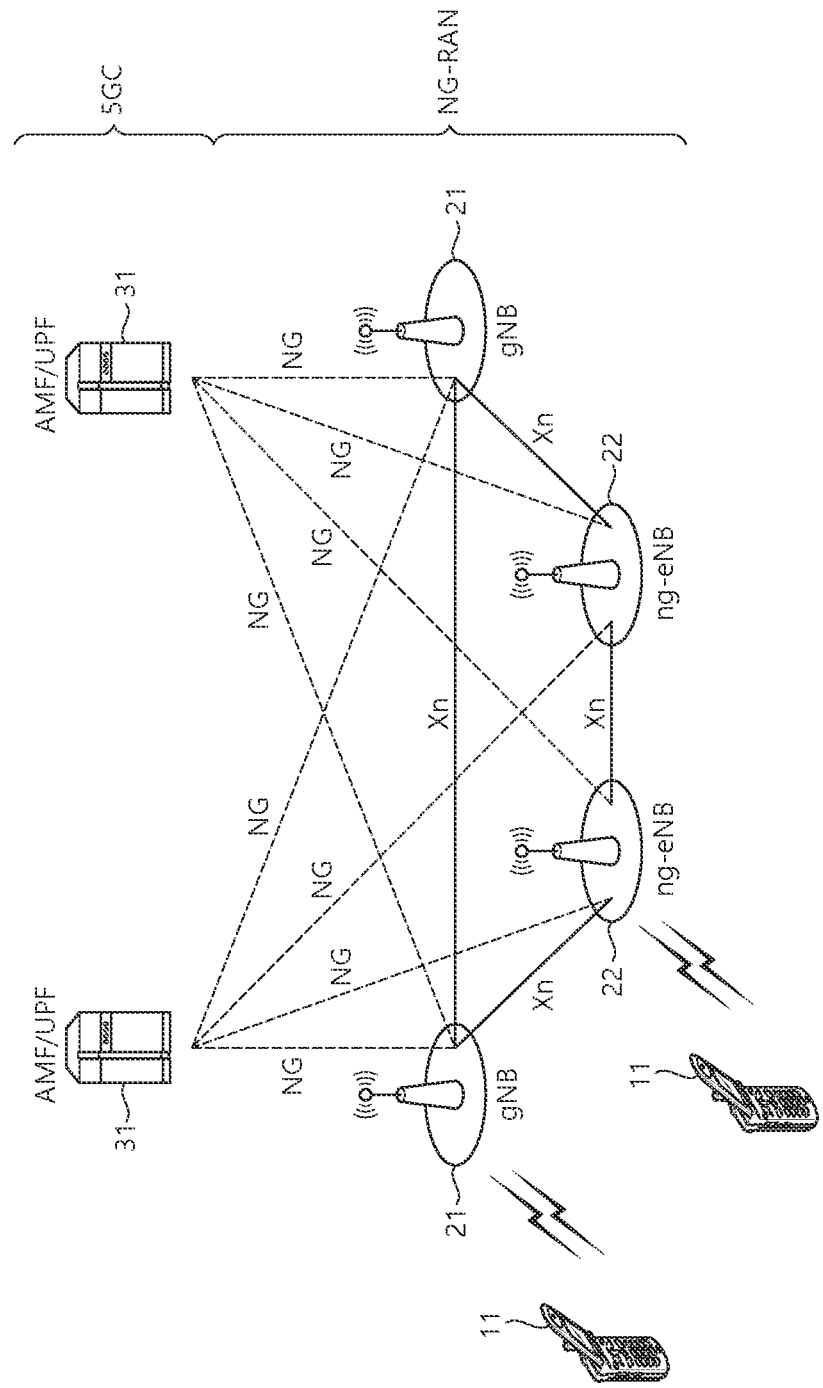
FIG. 4 shows another wireless communication system to which the present disclosure may be applied.

FIG. 4 shows another wireless communication system to which the present disclosure may be applied.

Specifically, FIG. 4 shows a system architecture based on a 5G new radio access technology (NR) system. An entity used in the 5G NR system (hereinafter, simply referred to as "NR") may absorb some or all functions of the entity (e.g., eNB, MME, S-GW) introduced in FIG. 1 (e.g., eNB, MME, S-GW). The entity used in the NR system may be identified in the name of "NG" to distinguish it from LTE.

Referring to FIG. 4, a wireless communication system includes one or more UEs 11, a next-generation RAN (NG-RAN), and a 5th generation core network (5GC). The NG-RAN consists of at least one NG-RAN node. The NG-RAN node is an entity corresponding to the BS 20 of FIG. 1. The NG-RAN node consists of at least one gNB 21 and/or at least one ng-eNB 22. The gNB 21 provides NR user plane and control plane protocol terminations towards the UE 11. The Ng-eNB 22 provides an E-UTRA user plane and control plane protocol terminations towards the UE 11.

The 5GC includes an access and mobility management function (AMF), a user plane function (UPF), and a session management function (SMF). The AMF hosts functions, such as non-access stratum (NAS) security, idle state mobility processing, and so on. The AMF is an entity including the conventional MMF function. The UPF hosts functions, such as mobility anchoring, protocol data unit (PDU) processing, and so on. The UPF is an entity including the conventional S-GW function. The SMF hosts functions, such as UE Internet Protocol (IP) address allocation, PDU session control, and so on.

The gNB and the ng-eNB are interconnected through an Xn interface. The gNB and the ng-eNB are also connected to the 5GC through an NG interface. More specifically, the gNB and the ng-eNB are connected to the AMF through an NG-C interface, and are connected to the UPF through an NG-U interface.

Figure 5:
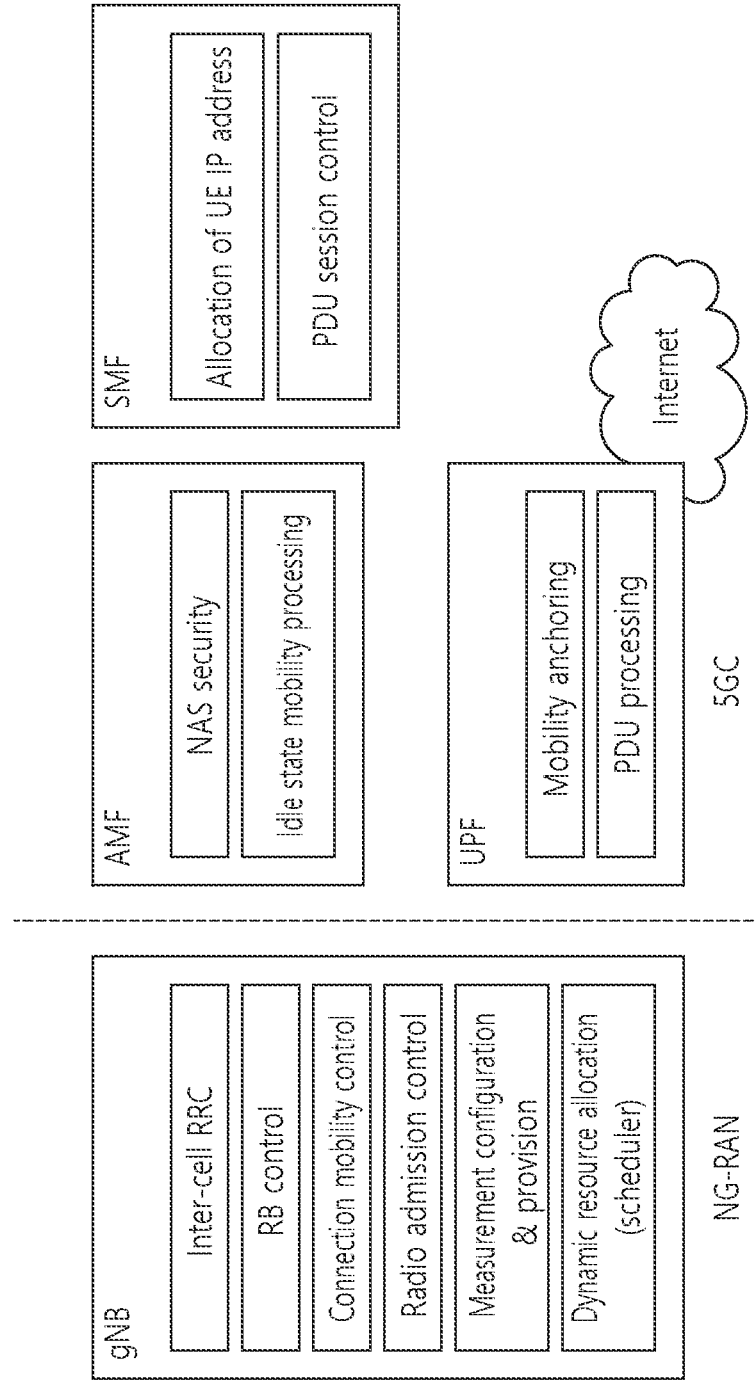
FIG. 5 illustrates a functional division between an NG-RAN and a 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
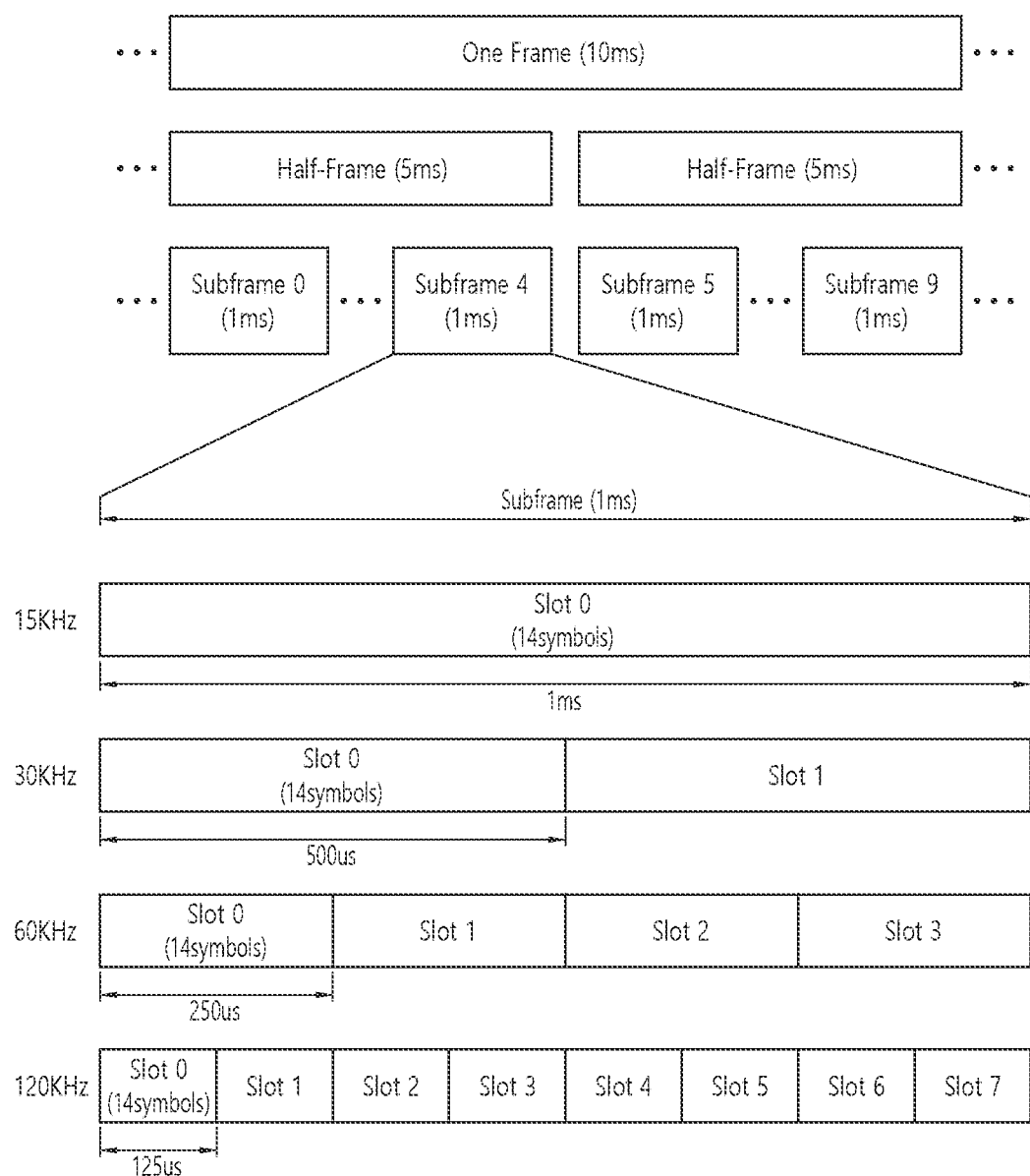
FIG. 6 illustrates an example of a frame structure that may be applied in NR.

FIG. 6 illustrates an example of a frame structure that may be applied in NR.

Referring to FIG. 6, a frame may be composed of 10 milliseconds (ms) and include 10 subframes each composed of 1 ms.

In the NR, uplink and downlink transmissions may be configured on a frame basis. A radio frame has a length of 10 ms, and may be defined as two 5 ms half-frames (HFs). The HF may be defined as five 1 ms sub-frames (SFs). The SF is divided into one or more slots, and the number of slots in the SF depends on a subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Herein, the symbol may include an OFDM symbol (or CP-OFDM symbol) and an SC-FDMA symbol (or DFT-S-OFDM symbol).

One or a plurality of slots may be included in a subframe according to subcarrier spacings.

The following table 1 illustrates a subcarrier spacing configuration

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal |
|   |    | Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations $\mu$.

TABLE 2

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 3 below illustrates that the number of symbols per slot, the number of slots per frame, and the number of slots per subframe vary depending on the SCS, in case of using an extended CP.

TABLE 3

| SCS (15 * 2^ μ) | $N^{slot}_{symb}$ | $N^{frame,u}_{slot}$ | $N^{subframe,u}_{slot}$ |
|---|---|---|---|
| 60 KHz (μ = 2) | 12 | 40 | 4 |

NR supports multiple numbers (or subcarrier spacing (SCS)) to support various 5G services. For example, when the SCS is 15 kHz, a wide region in the legacy cellular band is supported; and when the SCS is 30 kHz/60 kHz, dense urban areas, low time delay and wide carrier bandwidth are supported; and when the SCS is 60 kHz or more, a bandwidth of more than 24.25 GHz is supported in order to overcome phase noise.

The NR frequency band may be defined as two types of frequency ranges (FR1 and FR2). A numerical value of the frequency range may be changed and, for example, the two types of frequency ranges (FR1 and FR2) may be as shown in Table 4 below. For convenience of explanation, among the frequency ranges used in the NR system, FR1 may refer to "sub 6 GHz range" and FR2 may refer to "above 6 GHz range" and may be called millimeter wave (mmW).

TABLE 4

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As described above, the numerical value of the frequency range of the NR system may be changed. For example, FR1 may include a band of 410 MHz to 7125 MHz as shown in Table 5 below. That is, FR1 may include a frequency band of 6 GHz (or 5850, 5900, 5925 MHz, etc.) or higher. For example, the frequency band of 6 GHz (or 5850, 5900, 5925 MHz, etc.) or higher included in FR1 may include an unlicensed band. The unlicensed band may be used for various purposes, for example, for communication for a vehicle (e.g., autonomous driving).

TABLE 5

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Figure 7:
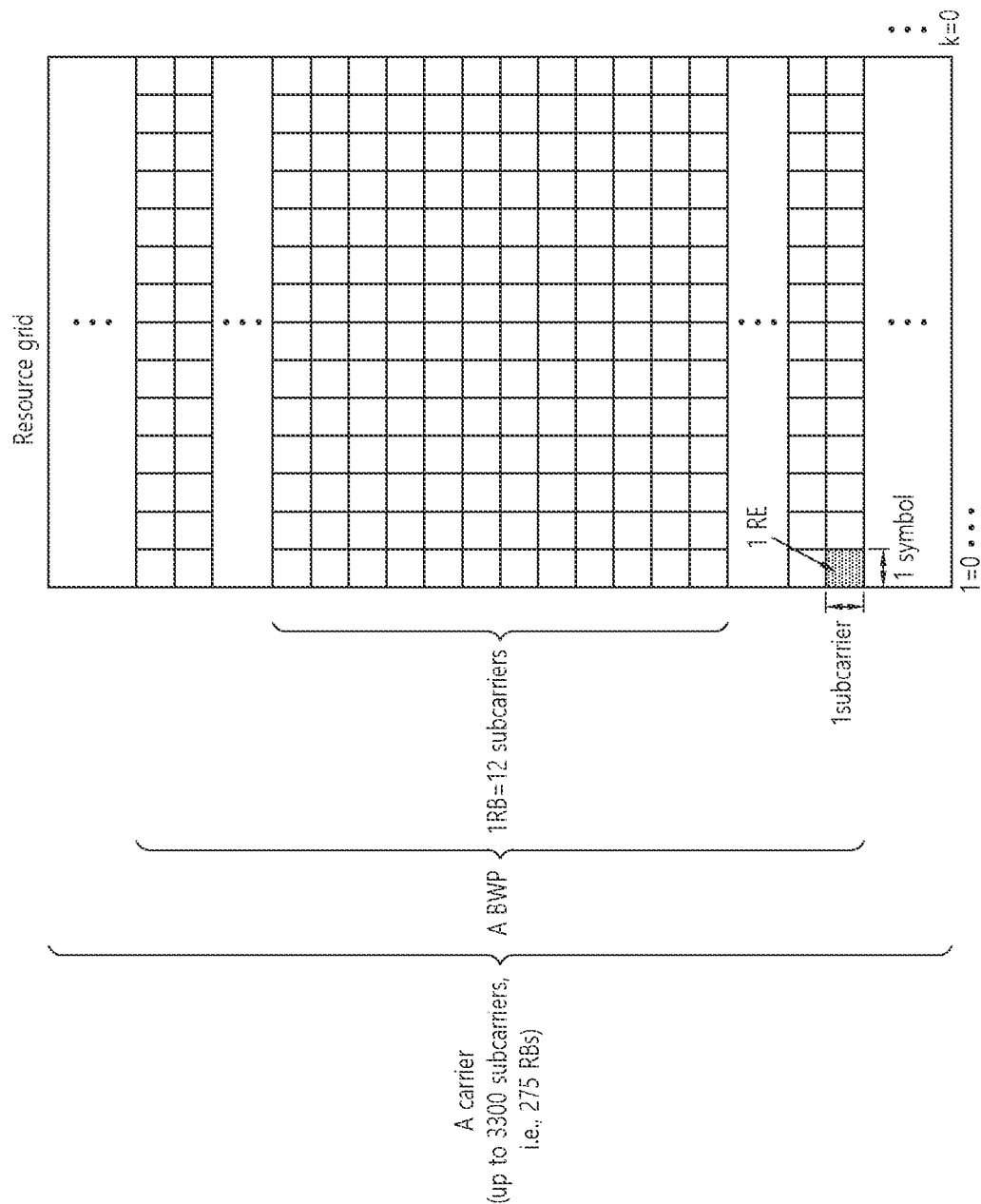
FIG. 7 illustrates a slot structure.

FIG. 7 illustrates a slot structure.

Referring to FIG. 7, a slot includes a plurality of symbols in a time domain. For example, in case of a normal CP, one slot may include 14 symbols. However, in case of an extended CP, one slot may include 12 symbols. Alternatively, in case of the normal CP, one slot may include 7 symbols. However, in case of the extended CP, one slot may include 6 symbols.

A carrier includes a plurality of subcarriers in a frequency domain. A resource block (RB) may be defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, and so on). The carrier ma include up to N (e.g., 5) BWPs. Data communication may be performed through an activated BWP. Each element may be referred to as a resource element (RE) within a resource grid, and one complex symbol may be mapped thereto.

A physical downlink control channel (PDCCH) may include one or more control channel elements (CCEs) as illustrated in the following table 6.

TABLE 6

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

A new unit called a control resource set (CORESET) may be introduced in the NR. The UE may receive a PDCCH in the CORESET.

Meanwhile, there is ongoing discussion on coverage enhancement (CE) for an uplink signal with respect to a physical uplink shared channel (PUSCH), a physical uplink control channel (PUCCH), and other signals. Hereinafter, a PUCCH CE is described.

In the existing NR, a method of performing repetition for the PUCCH CE is considered. The PUCCH repetition may be applied only to PUCCH formats 1, 3, and 4 (a long PUCCH). In addition, three cases may be considered in which the number of PUCCH repetitions is nrofSlots=n2, n4, and n8 (PUCCH-FormatConfig). In the PUCCH repetition, the repeated PUCCH may have the same number of consecutive symbols and the same first symbol, and all of them may be located in the same position in a slot. In addition, when interslotFrequencyHopping is set during the PUCCH repetition, frequency hopping may be applied to startingPRB for even-numbered slots and secondHopPRB for odd-numbered slots. In addition, the UE does not multiplex different uplink control information (UCI) types of the repeated PUCCH. Therefore, when different PUCCHs overlap in a duration in the slot, the UE transmits only any one PUCCH according to a priority rule (e.g., HARQ-ACK>SR>CSI) and drops the remaining PUCCHs, or transmits an earlier starting PUCCH (with same priority).

The PUCCH repetition is performed only at the same position in each slot only for the long PUCCH, and thus, in practice, the number of repetitions may be less than a set number. In particular, as mentioned above, since a special slot (S slot) includes all of downlink (D), flexible (F), and uplink (U) symbols, it is difficult to perform the PUCCH repetition. To solve this problem, a next-generation PUCCH CE method may be considered (e.g., a DMRS-less PUCCH, PUCCH repetition such as PUSCH repetition type B for UCI of at least 11 bits or less, explicit or implicit dynamic PUCCH repetition factor indication, DMRS bundling cross PUCCH repetition, or the like). PUCCH repetition transmission in the S slot through UCI split may also be considered as one method, but this has a limitation in that a gain is higher in terms of latency reduction than in terms of CE. With the PUCCH repetition in the new method, a method of repeatedly transmitting consecutive symbols may be considered, instead of specifying and repeating a start symbol and length in the slot similarly in the existing PUSCH repetition type B.

Hereinafter, a technical problem of the DMRS bundle in the PUSCH/PUCCH is described.

In relation to CE, there is ongoing discussion on the DMRS bundling in the PUSCH and the PUCCH. Since channel estimation performance degradation caused by a low signal to noise ratio (SNR) is a main cause of CE performance degradation, a method of improving channel estimation performance through an SNR gain by bundling and estimating a DMRS of the repeated PUSCH/PUCCH is considered. When this operation is supported in the 3GPP standard, it is required to determine a DMRS bundle size. Two main problems may occur when the DMRS bundle size is not pre-defined.

First, there is a problem of power control for the DMRS bundle. Since the existing power control is performed according to a transmission occasion, power is allocated irrespective of whether bundling is performed or not, and thus transmit power of the bundle is not identically maintained. Such a change in power may cause a local oscillator to be out of synchronization, which may result in reception performance degradation.

Second, power consistency may not be maintained due to a collision or the like of the PUSCH/PUCCH for which the DMRS bundle is instructed. Since the existing collision-based power allocation rule is performed according to a transmission occasion, power allocation is performed separately even if the PUSCH/PUCCH are bundled, and one of transmission occasions configured through a bundle may be dropped, or lower power may be allocated to one of the transmission occasions configured through the bundle. In this case, reception performance of a gNB is degraded. In addition, in case of dual connectivity (DC), since the gNB does not expect the operation of a UE, reception performance may be significantly degraded.

Accordingly, the present specification proposes a method for maintaining transmit power consistency of the PUSCH/PUCCH aggregated/configured through a DMRS bundle.

The DMRS bundle in the present specification may mean a bundle instructed for all or some of identical multiple PUCCHs or multiple PUSCHs transmitted by setting repetition for the purpose of channel estimation performance enhancement in a receiving end. Although a method proposed in the present specification is described by assuming the PUSCH and the PUCCH, the method of the present specification may also be extendedly applied to another uplink channel. Further, when a single PUSCH or PUCCH is transmitted in a slot, a transmission occasion described below may mean transmission of the slot or the PUSCH or the PUCCH. Furthermore, even when several PUSCHs or PUCCHs are transmitted in the slot, the transmission occasion may also mean transmission of the slot or the PUSCH or the PUCCH.

In addition, the DMRS bundle of the present specification may mean a specific time-domain window configured to the UE by the gNB for the purpose of joint channel estimation or a time duration in which the gNB expects that the UE has the same specific parameters without a configuration. Specifically, for a specific transmission occasion of the UE, the DMRS bundle of the present specification may mean a time-axis duration of an aggregation of two or more such transmission occasions if a phase, transmit power, physical resource block (PRB), modulation order, transmission timing, or the like is expected to be the same as, or to have at least a specific level of similarity with, that of another transmission occasion in which the UE performs transmission, or if it is instructed to maintain the same or at least the specific level of similarity. Alternatively, for transmission occasions of pre-agreed specific durations, the DMRS bundle may mean a time-axis duration of such transmission occasions if a phase, transmit power, PRB, modulation order, transmission timing, or the like is expected to be the same, or to have at least a specific level of similarity, or if it is instructed to maintain the same or at least the specific level of similarity.

[Uplink Power Control of DMRS Bundle]

Hereinafter, uplink power control of a PUSCH and PUCCH will be described. When it is descried for the PUSCH or the PUCCH, the content described below may be applied to both the PUSCH and the PUCCH.

In relation to the uplink power control of the DMRS bundle, a change of a transmission occasion of the DMRS bundle will be described.

In the existing NR, the power control of the PUSCH/PUCCH may be based on the transmission occasion. The transmission occasion may be defined as follows.

A PUSCH/PUCCH/SRS/PRACH transmission occasion i may be defined by a slot index $n^{\mu}_{s,f}$ having a system frame number (SFN), a first symbol S in a slot, and the number L of consecutive symbols.

According to the above definition, the transmission occasion is defined as a slot index in the SFN. In addition thereto, PUSCHs aggregated through the DMRS bundle and PUCCHs aggregated through the DMRS bundle may be configured to have the same transmission occasion. Herein, only for a case where the transmission occasion i has a DMRS bundle relationship with an (i−1)-th transmission occasion or a case of being aggregated for joint decoding of a receiving end, not i but i−1 may be applied to the transmission occasion i, like in a previous transmission occasion. That is, a plurality of transmission occasions may have the same index. In this case, the same transmit power may be applied to all DMRS bundle relationships. Accordingly, power consistency may be maintained.

Alternatively, in a case where an i-th transmission occasion has a DMRS bundle relationship with an immediately previous (i−1)-th transmission occasion or in a case of being aggregated for joint decoding of the receiving end, power control of the (i−1)-th transmission occasion may be applied to the i-th transmission occasion.

In relation to the uplink power control of the DMRS bundle, power control of the DMRS bundle in which a transmission occasion does not change will be described.

Although the index of the transmission occasion may be given equally to the DMRS bundle or the transmit power may be configured equally for all of the DMRS bundles as in the aforementioned method, the following method may be considered instead of the aforementioned method. In the conventional uplink power control, it may be expected that a pathloss, specified nominal power, or the like corresponding to an open loop power control does not change instantaneously, and a power control value based on an MCS (PUSCH) or PUCCH format is repeated and thus may be identical in all of the DMRS bundles. Therefore, a transmission power control command (TPC) value which varies depending on a closed loop power control may change instantaneously (since a DCI-based instruction is possible in the middle of transmission). Accordingly, the TPC command may be applied to the DMRS bundle or the PUSCH or PUCCH aggregation which requires joint decoding of the receiving end, based on the following two methods.

As a first method, a method in which the same uplink power is maintained between DMRS bundles may be considered.

A UE may be instructed to accumulate and apply a TPC received through tpc-Accumulation.

In the existing TPC command, an operation of the PUSCH when the UE reaches maximum/minimum power may be as follows. Herein, the PUSCH and the PUCCH may be used alternately.

If the UE reaches maximum power with respect to an active uplink bandwidth part (BWP) b of a carrier f of a serving cell C in a PUSCH transmission occasion $i-i_0$, and if Equation 1 is satisfied, Equation 2 may be satisfied.

$$\sum_{m=0}^{C(D_i)-1} \delta_{PUSCH,b,f,c}(m, l) \geq 0 \quad \text{[Equation 1]}$$

$$f_{b,f,c}(i,l) = f_{b,f,c}(i-i_0, l) \quad \text{[Equation 2]}$$

If the UE reaches minimum power with respect to the active uplink BWP b of the carrier f of the serving cell C in the PUSCH transmission occasion $i-i_0$, and if Equation 3 is satisfied, Equation 4 may be satisfied.

$$\sum_{m=0}^{C(D_i)-1} \delta_{PUSCH,b,f,c}(m, l) \leq 0 \quad \text{[Equation 3]}$$

$$f_{b,f,c}(i,l) = f_{b,f,c}(-i_0, l) \quad \text{[Equation 4]}$$

That is, if the UE reaches the maximum (minimum) power, and if the instructed TPC accumulation is a positive (negative) value, closed loop power of the immediately previous transmission occasion may be applied equally. Herein, a condition for the DMRS bundle may be added. That is, the following configuration may be defined.

If the PUSCH/PUCCH transmission occasion i is configured to be bundled in the transmission occasion $i-i_0$, Equation 5 may be satisfied.

$$f_{b,f,c}(i,l) = f_{b,f,c}(i-i_0, l) \quad \text{[Equation 5]}$$

If the configuration is additionally defined, uplink power control may be performed in unit of the DMRS bundle. A PUSCH operation related thereto may be as follows. Herein, the PUSCH and the PUCCH may be used alternately.

Equation 6 expresses a sum of TPC command values in a set $D_i$ of TPC command values having a cardinality $C(D_i)$ received by the UE between $K_{PUSCH}(i-i_0)-1$ symbols before a PUSCH transmission occasion $i-i_0$ and $K_{PUSCH}(i)$ symbols before a PUSCH transmission occasion I at an active uplink BWP b of a carrier f of a serving cell C for a PUSCH power control adjustment state I. Herein, $i_0(i_0 > 0)$ is a smallest integer in which $K_{PUSCH}(i-i_0)$ symbols before the PUSCH transmission occasion $i-i_0$ are earlier than $K_{PUSCH}(i)$ symbols before the PUSCH transmission occasion I.

$$\sum_{m=0}^{C(D_i)-1} \delta_{PUSCH,b,f,c}(m, l) \quad \text{[Equation 6]}$$

If PUSCH transmission is scheduled by the DCI format, $K_{PUSCH}(i)$ denotes a plurality of symbols after a last symbol of corresponding PDCCH reception and before a first symbol of PUSCH transmission with respect to the active uplink BWP b of the carrier f of the serving C.

That is, when it is instructed based on the DCI irrespective of the PUCCH/PUSCH, a TPC received from corresponding PDCCH reception to a start symbol of PUSCH/PUCCH transmission may be applied, or a TPC received from a nearest previous PUSCH/PUCCH transmission occasion may be applied. Herein, considering the DMRS bundling, the following method may be taken into consideration.

Method 1) Applying of TPC command in unit of bundle

A sum of TPC command values received in a duration from a first transmission occasion of a (k−1)-th DMRS bundle to a first transmission occasion of a k-th DMRS bundle may be equally applied to all transmission occasions of the k-th DMRS bundle. That is, power control adjustment may be performed when transmission is performed for the first transmission occasion of the k-th DMRS bundle, and power control adjustment for the remaining transmission occasions may not be performed.

Alternatively, when $i_k$ denote a first transmission occasion of a k-th DMRS bundle and $i_{k-1}$ denotes a first transmission occasion of a (k−1)-th DMRS bundle, a sum of TPC command values received during a duration from $K_{PUSCH}(i_{k-1})-1$ symbols before the transmission occasion $i_{k-1}$ and $K_{PUSCH}(i_k)$ symbols before the transmission occasion $i_k$ may be applied in the transmission occasion $i_k$. Thereafter, in the remaining transmission occasions in the k-th DMRS bundle, power control adjustment may be not performed, and transmit power at the transmission occasion $i_k$ may be equally applied. In this case, both $K_{PUSCH}(i_k)$ and $K_{PUSCH}(i_{k-1})$ may be the number of symbols for the uplink BWP b of the carrier f in the serving C after the last symbol of corresponding PDCCH reception and before the first symbol of PUSCH transmission. In this case, when the PUSCH is transmitted repetitively, PUSCH transmission may imply PUSCH transmission at a first PUSCH transmission occasion (or a first PUSCH repetition).

In the case of PUCCH transmission, the PUSCH may be interpreted by being replaced with the PUCCH.

Method 2) Applying of only TPC command value received in part of bundle

A TPC command received in a duration from a first transmission occasion of a (k−1)-th DMRS bundle to an n-th transmission occasion in the same bundle may be equally applied to all transmission occasions of a k-th DMRS bundle. In this case, a duration in which a UE monitors the TPC command may be decreased.

Alternatively, a TPC command received in a duration from an n-th transmission occasion of the (k−1)-th DMRS bundle to a last transmission occasion in the same bundle may be equally applied to all transmission occasions of the k-th DMRS bundle. In this case, the duration in which the UE monitors the TPC command may be decreased. In addition, a gNB may instruct a command with DCI at a time imminent to transmission, which may result in an increase in flexibility of power control.

As a second method, a method in which an uplink power variable between DMRS bundles is maintained to be less than or equal to a specific level may be considered.

In an aspect of a network operation, maintaining of a specific resource (beam direction, time/frequency resource, etc.) for a long time may cause an increase in inter cell interference or a deterioration in scheduling flexibility. In addition, in terms of a UE, when transmit power is allocated for a long time by a DMRS bundle, power allocation for other transmission signals may be continuously interfered. Therefore, power is not maintained equally for all times, but a power variable less than or equal to a pre-agreed or defined specific value may be guaranteed.

For example, the UE may determine that tpc-Accumulation is always configured in the remaining transmission occasions except for the first transmission occasion of the DMRS bundle. Alternatively, an instruction of the DMRS bundle and an instruction of the tpc-Accumulation may be performed together. Additionally or independently, referring to Table 7 and Table 8, a command range may be limited with respect to the DMRS bundle for the PUSCH and PUCCH, or a scaling factor may be applied to the existing applying range. Table 7 is a mapping table for an absolute or accumulated value $\delta_{PUSCH,b,f,c}$ or $\delta_{SRS,b,f,c}$ of a TPC command included in a DCI format for scheduling PUSCH transmission or a DCI format 2_2 or DCI format 2_3 which is CRC scrambled by TPC-PUSCH-RNTI. Table 8 is a mapping table for an accumulated value $\delta_{PUCCH,b,f,c}$ of a TPC command included in a DCI format 1_0 or a DCI format 1_1 or a DCI format 2_2 which is CRC scrambled by TPC-PUCCH-RNTI.

TABLE 7

| TPC Command Field | Accumulated $\delta_{PUSCH, b, f, c}$ or $\delta_{SRS, b, f, c}$ [dB] | Absolute $\delta_{PUSCH, b, f, c}$ or $\delta_{SRS, b, f, c}$ [dB] |
| --- | --- | --- |
| 0 | −1 | −4 |
| 1 | 0 | −1 |
| 2 | 1 | 1 |
| 3 | 3 | 4 |

TABLE 8

| TPC Command Field | Accumulated $\delta_{PUCCH, b, f, c}$ [dB] |
| --- | --- |
| 0 | −1 |
| 1 | 0 |
| 2 | 1 |
| 3 | 3 |

The applying of the scaling factor may mean that power control adjustment due to the closed-loop power control is multiplied by a variable less than 1 and is applied to power control of the PUCCH/PUSCH.

In relation to the uplink power control of the DMRS bundle, the DMRS bundle based on a PUSCH/PUCCH type or power control in a time-domain window for joint channel estimation will be described.

In case of joint channel estimation, a time-domain window may be specified in which the UE is expected to maintain phase continuity and power consistency between PUSCH transmissions according to requirements of the power consistency and phase continuity.

In order to ensure joint channel estimation performance, in the time-domain window, transmit power, phase, timing, or the like may need to be unchanged or to be maintained within a specific range. In addition, the following content may be applied as to whether a basic unit of the joint channel estimation is defined according to a PUSCH type or whether the same basic unit is applied irrespective of the PUSCH type.

For the time-domain window for joint channel estimation, a unit of the time-domain window may be defined independently or equally with respect to next PUSCH transmission.

PUSCH repetition type A
PUSCH repetition type B
TBoMS(Transmit block processing over multiple slot)
Different TB(transport block)

Herein, as a candidate of the basic unit of the time-domain window, a set of (consecutive) slots or a set of transmission occasions (repetitions) may be considered. Herein, the following cases may be considered. Hereinafter, TO implies a transmission occasion.

Case 1) When every PUSCH/PUCCH has the same unit of time-domain window for joint channel estimation Case 1-1) TO may be considered as the unit of the time-domain window for joint channel estimation.

That is, for all of the PUCCH (including repetition in a slot), the PUSCH repetition type A, the PUSCH repetition type B, and the different TB, the time-domain window for joint channel estimation may be configured in unit of TO. In this case, since all uplink power controls may also be performed in unit of TO, units of the time-domain window and the power control are identical, which may result in no ambiguity.

Case 1-2) Slot(s) may be considered in unit of the time-domain window for joint channel estimation.

In case of the PUCCH, the PUSCH repetition type A, and the TBoMS, since one slot is mapped to one TO, ambiguity for the power control may not occur like in the Case 1-1. However, in case of the PUSCH repetition type B, one slot may be mapped to several TOs, which may result in ambiguity occurring in the power control. That is, when the window is configured in unit of slots, a boundary of a window for joint channel estimation and a boundary of TO performing uplink power adjustment may be misaligned, and thus power adjustment may not be performed in the window for joint channel estimation during repetition is performed.

Figure 8:
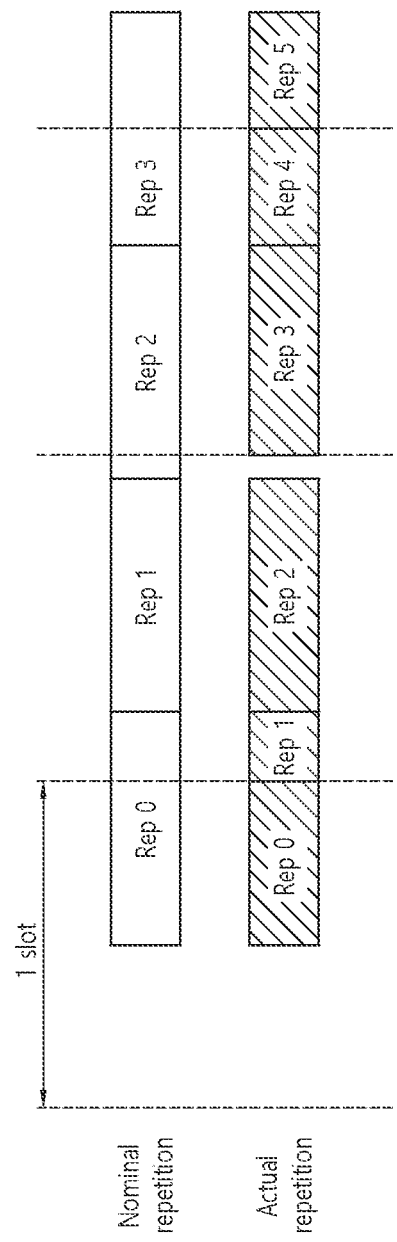
FIG. 8 illustrates an example of arrangement of nominal repetition and actual repetition.

FIG. 8 illustrates an example of arrangement of nominal repetition and actual repetition.

For example, in case of a PUSCH repetition type B, a case of FIG. 8 may be assumed. The existing power control mechanism is performed in unit of nominal repetition, but transmission in unit of actual transmission may be performed according to a slot boundary. Accordingly, in FIG. 8, for example, when a first slot to a third slot are set as a time-domain window for joint channel estimation and power adjustment is executed in Rep3 of nominal repetition, transmit power of Rep3 of actual transmission and transmit power of Rep4 may be set to be different from each other. In this case, since it does not conform to a condition of joint channel estimation, even if a gNB does not expect that receive power varies, there may be a case of being configured as described above.

To solve this problem, the followings may be considered.

Alternative 1-1) If the unit of the time-domain window is a slot, when a power control is performed according to the conventional uplink power control of the PUSCH repetition type B, the UE may not perform a power control in which uplink power is expected to be changed in the unit of the time-domain window (i.e., the slot).

Alternative 1-2) If the unit of the time-domain window is the slot, the UE may set an execution unit of the uplink power adjustment for the PUSCH repetition type B to be identical to the unit of the time-domain (i.e., the slot), or may change it to an actual repetition unit.

Alternative 1-3) The UE may determine that only the power control of the most advanced symbol in the unit of the time-domain window (i.e., the slot) is valid. That is, when multiple uplink power control adjustments are performed in the time-domain window, the UE may determine that only the uplink power adjustment which is the most advanced in time or the most prioritized according to a grant order is valid.

When joint channel estimation is performed for different TBs, the following content may be considered.

Alternative 2-1) When joint channel estimation is performed for the different TB and the unit of power control and the time-domain window are not identical, for example, when the joint channel estimation is performed for the entirety or part of the PUSCH repetition type A and the entirety or part pf the PUSCH repetition type B, an execution unit of uplink power control with respect to the PUSCH repetition type B may be set to be identical to the time-domain window (i.e., slot(s)) or may be changed to the actual repetition unit.

Case 2) When the unit of the time-domain window for joint channel estimation is different with respect to the PUSCH/PUCCH type For the PUCCH, the PUSCH repetition A, and the TBoMS, it is not affected since the unit of the time-domain window for joint channel estimation is identical whether it is slot(s) or TO. Otherwise, in case of the PUSCH repetition type B, the same situation as the Case 1-2 may occur. Accordingly, to solve this problem, the following alternatives may be considered.

Alternative 3-1) The unit of the time-domain window may always be set to a TO unit. That is, for the PUSCH repetition type B without a special configuration or for joint channel estimation including the PUSCH repetition type B, the unit of the time-domain window may always be set to the TO. Alternatively, even if the unit of the time-domain window is set differently from the above description, the unit may be changed to the TO when the PUSCH repetition type B is included in a specific time-domain window.

Alternative 3-2) The same method as the alternative 1-1) and alternative 1-2) of the Case 1-2 may be considered.

[Power allocation and collision handling of DMRS bundling]

For a single cell operation having two uplink carriers or for a carrier aggregation situation, when transmit power for PUSCH/PUCCH/PRACH/SRS transmission of a transmission occasion of a UE exceeds total UE transmit power, an example of a priority order of power allocation is as follows.

PRACH transmission on PCell

PUCCH transmission including HARQ-ACK information and/or SR and/or LRR or PUSCH transmission including HARQ-ACK information PUCCH transmission including CSI or PUSCH transmission having CSI PUSCH transmission not including HARQ-ACK information or CSI, and in case of a type-2 random access procedure, PUSCH transmission on PCell SRS transmission having aperiodic SRS with a higher priority than semi-static and/or periodic SRS or PRACH transmission on a serving cell other than PCell In this case, since a priority of a PUSCH/PUCCH in which a DMRS bundle is configured does not exist, a new order for this is required. In addition, in a dual connectivity or carrier aggregation or single cell operation situation, there is a need to define an operation in which transmit power in an uplink transmission occasion is to be reduced or an operation in which transmission is dropped.

First, a priority order of transmit power allocation of a DMRS bundle in a single-cell operation or a carrier aggregation environment will be described.

Since a PUSCH/PUCCH instructed through the DMRS bundle is instructed by a gNB to improve coverage enhancement, a gain is obtained only when power consistency is maintained for the bundle, thereby expecting successful decoding of the gNB. In this aspect, the DMRS bundle preferably has a high priority, and the following order may be defined. In the order described below, a priority of transmission described earlier may be a relatively higher priority of transmission.

PRACH transmission on PCell

DMRS bundle of PUCCH transmission having HARQ-ACK information and/or SR and/or LRR, or DMRS bundle of PUSCH transmission having HARQ-ACK information DMRS bundle of PUCCH having CSI or PUSCH having CSI DMRS bundle of PUSCH transmission not including HARQ information or CSI, and in case of a type-2 random access procedure, DMRS bundle of PUSCH transmission on PCell PUCCH transmission including HARQ-ACK information and/or SR and/or LRR or PUSCH transmission including HARQ-ACK information PUCCH transmission including CSI or PUSCH transmission having CSI PUSCH transmission not including HARQ-ACK information or CSI, and in case of a type-2 random access procedure, PUSCH transmission on PCell SRS transmission having aperiodic SRS with a higher priority than semi-static and/or periodic SRS or PRACH transmission on a serving cell other than PCell Alternatively, since the DMRS bundle maintains high transmit power during a time instructed through the bundle, in case of having a high priority at the same time, power allocation of another transmission signal may not be smoothly achieved. Therefore, it may be preferable to have a relatively low priority, and the following order may be defined.

PRACH transmission on PCell

PUCCH transmission including HARQ-ACK information and/or SR and/or LRR or PUSCH transmission including HARQ-ACK information PUCCH transmission including CSI or PUSCH transmission having CSI PUSCH transmission not including HARQ-ACK information or CSI, and in case of a type-2 random access procedure, PUSCH transmission on PCell SRS transmission having aperiodic SRS with a higher priority than semi-static and/or periodic SRS or PRACH transmission on a serving cell other than PCell DMRS bundle of PUCCH having CSI or PUSCH having CSI DMRS bundle of PUSCH transmission not including HARQ information or CSI, and in case of a type-2 random access procedure, DMRS bundle of PUSCH transmission on PCell SRS transmission having aperiodic SRS with a higher priority than semi-static and/or periodic SRS or PRACH transmission on a serving cell other than PCell Unlike the aforementioned method, a priority order for the existing content may be set before the priority order of the DMRS bundle. Therefore, the following two options may be considered. First, the DMRS bundle may have a high priority order only when the content is identical, as follows.

PRACH transmission on PCell

DMRS bundle of PUCCH transmission having HARQ-ACK information and/or SR and/or LRR, or DMRS bundle of PUSCH transmission having HARQ-ACK information PUCCH transmission including HARQ-ACK information and/or SR and/or LRR or PUSCH transmission including HARQ-ACK information DMRS bundle of PUCCH having CSI or PUSCH having CSI PUCCH transmission including CSI or PUSCH transmission having CSI DMRS bundle of PUSCH transmission not including HARQ information or CSI, and in case of a type-2 random access procedure, DMRS bundle of PUSCH transmission on PCell PUSCH transmission not including HARQ-ACK information or CSI, and in case of a type-2 random access procedure, PUSCH transmission on PCell SRS transmission having aperiodic SRS with a higher priority than semi-static and/or periodic SRS or PRACH transmission on a serving cell other than PCell Second, the DMRS bundle may have a low priority order only when the content is identical, as follows.

PRACH transmission on PCell

PUCCH transmission including HARQ-ACK information and/or SR and/or LRR or PUSCH transmission including HARQ-ACK information DMRS bundle of PUCCH transmission having HARQ-ACK information and/or SR and/or LRR, or DMRS bundle of PUSCH transmission having HARQ-ACK information PUCCH transmission including CSI or PUSCH transmission having CSI DMRS bundle of PUCCH having CSI or PUSCH having CSI PUSCH transmission not including HARQ-ACK information or CSI, and in case of a type-2 random access procedure, PUSCH transmission on PCell DMRS bundle of PUSCH transmission not including HARQ information or CSI, and in case of a type-2 random access procedure, DMRS bundle of PUSCH transmission on PCell SRS transmission having aperiodic SRS with a higher priority than semi-static and/or periodic SRS or PRACH transmission on a serving cell other than PCell Next, DMRS bundle drop/power reduction handling will be described.

Figure 9:
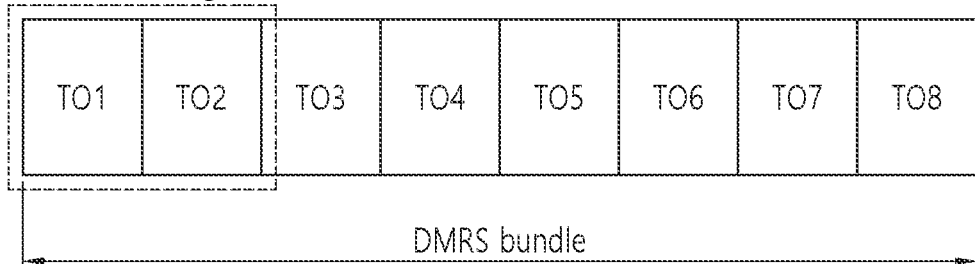
FIG. 9 illustrates an example of the case 3-1.
Figure 10:
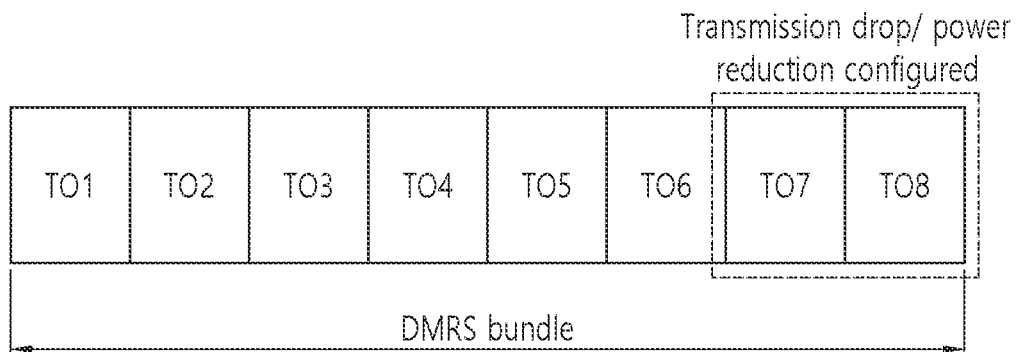
FIG. 10 illustrates an example of the case 3-2.

In the existing NR system, for different uplinks overlapping in a DC environment, an operation of dropping transmission of a low priority or transmission of MCG/SCG according to UE capability (dynamic power sharing/semi-static power sharing) is defined. When PUSCH/PUCCH transmission requiring transmission drop or transmit power reduction according to the conventional method is configured through a DMRS bundle or when, even in a single-cell operation/CA environment, PUSCH/PUCCH transmission instructed through the DMRS bundle shall be dropped or transmit power shall be reduced according to a priority rule or due to insufficient transmit power, two cases may be roughly considered, i.e., a case of instructing drop/power reduction of a transmission occasion advanced in time (case 3-1) and a case of instructing drop/power reduction of a transmission occasion later in time (case 3-2) among DMRS bundles. FIG. 9 illustrates an example of the case 3-1. FIG. 10 illustrates an example of the case 3-2. In FIG. 9 and FIG. 10, TO implies a transmission occasion.

The following three methods may be considered under this situation.

Method 1) A DMRS bundle may be dropped.

That is, in the case 3-1, transmission of all DMRS bundles TO1, TO2, . . . , TO8 may be dropped. In the case 3-2, if the UE knows in advance that drop/power reduction of TO7 and TO8 is to be configured in advance, the UE may drop all DMRS bundles. Otherwise, if the UE does not know in advance configuration information on the drop/power reduction of TO7 and TO8, the UE is not able to drop all of the DMRS bundles, and thus the UE may drop only TO7 and To8 unlike in the aforementioned method. Alternatively, if the UE receives an instruction for the drop/power reduction of transmission in a duration from a transmission start time point of the DMRS bundle to a start time point of a slot or TO in which the drop/power reduction of the transmission is set, the UE may drop all TOs corresponding to the DMRS bundle starting from a TO nearest to a reception time point, or may drop all TOs according to UE implementation in a duration from the reception time point to a start time point of the instructed TO. For example, referring to FIG. 10, if the UE receives corresponding information at TO4, the UE may drop all of TO4, TO5, TO6, TO7, and TO8, or may drop TO5, TO6, TO7, and TO8 according to the UE implementation.

Alternatively, transmission may be dropped only for a transmission occasion in which transmission shall be dropped or transmit power shall be reduced due to insufficient transmit power. That is, referring to FIG. 9, in the case 3-1, the UE may drop only transmission at TO1 and TO2, and may perform transmission for the remaining TOs in the DMRS bundle. Alternatively, for example, when transmit power shall be reduced due to uplink transmission in another carrier at TO4 of FIG. 10, the UE may drop transmission at TO4, and may perform transmission at TO5, TO6, TO7, and TO8 with original transmit power.

Method 2) Transmit power of the entire DMRS bundle may be reduced.

A smallest value among TOs in which reduction of transmit power is instructed may be applied to an amount of transmit power to be reduced. According to the aforementioned method, transmit power of the entire DMTS bundle (TO1, TO2, . . . 0, TO8) may be reduced in the case 3-1. In addition, for the case 3-2, if the UE knows in advance that drop/power reduction is configured for TO7 and To8, the UE may reduce transmit power of the entire DMRS bundle.

However, if the UE does not know such information before starting the transmission of the DMRS bundle or does not have an ability to predict transmit power at a plurality of TOs in the DMRS bundle, the UE is not able to reduce power of the entire DMRS bundle. Therefore, in this case, the UE may apply the method 1. For example, for the case 3-2, unlike in the aforementioned method, the UE may perform power reduction of only To7 and To8. Alternatively, if the UE receives an instruction for the transmission drop/power reduction in a duration from a transmission start time point of the DMRS bundle to a start time point of a slot or TO in which the transmission drop/power reduction is configured, the UE may perform power reduction for all TOs corresponding to the DMRS bundle starting from a TO nearest to a reception time point, or may reduce power of all TOs according to UE implementation in a duration from the reception time point to a start time point of the instructed TO. For example, in the example of FIG. 10, if the UE receives corresponding information at To4, the UE may perform power reduction for all of TO4, TO5, TO6, TO7, and TO8, or may perform power reduction for TO5, TO6, TO7, and TO8 according to the UE implementation.

That is, the UE may apply the method 1 or the method 2 according to the UE capability or situation.

In relation to the method 1 and the method 2, since the UE drops transmission or performs transmit power reduction for an TO not instructed, which is different from the conventional manner, the UE may additionally instruct the gNB to perform the operation. That is, although the UE is not instructed to perform transmission drop/power reduction, it is possible to instruct an index of a TO in which transmission drop/power reduction is performed, a slot number in an SFN, or the like.

Method 3) An operation is achieved according to the existing criterion irrespective of the DMRS bundle.

When the aforementioned methods are used to drop transmission of all transmission occasions of the DMRS bundle or to perform transmission by reducing any amount of power or when the conventional method is used to drop transmission of some transmission occasions of the DMRS bundle or to perform transmission by reducing any amount of power, the UE may instruct a corresponding cell to perform the operation in advance or at a later time. Such an instruction may report a DMRS bundle, in which transmit power is reduced or transmission is dropped, a transmission occasion, or a slot index in an SFN. Alternatively, for the DMRS bundle in which transmission is performed by reducing transmit power, the UE may report a difference of transmit power reduced compared to the instructed power, additionally or by including it in the aforementioned instruction. Such an instruction may cause a deterioration of reception performance of the entire DMRS bundle when power consistency of the DMRS bundle is not maintained differently from the expectation of the gNB. Therefore, when the instruction is performed differently from the conventional operation, reception of the entire DMRS bundle may be dropped or decoding is performed except for a specific transmission occasion in the DMRS bundle, thereby preventing the deterioration of reception performance.

Method 4) For a TO instructed to reduce transmit power or a TO which needs to perform transmission by reducing transmit power, the UE may perform transmission by reducing transmit power. In this case, when a magnitude of the transmit power to be reduced is less than or equal to, or less than, a specific value (hereinafter, referred to as alpha), the UE may reduce the transmit power, and if the magnitude of the transmit power to be reduced is greater than, or greater than or equal to, the alpha, the UE may apply the aforementioned method 1 or method 2. This is because a slight power variation for a DMRS bundle duration may not significantly affect channel estimation performance. In this case, a value of alpha may be defined to be a fixed value in a standard, or may be a value set from a network to the UE through RRC or the like. In particular, the value of alpha may be determined differently according to a current transmit power value. For example, when the current transmit power of the UE is P1, the value of alpha may be determined as a product between P1 and beta (herein, beta is a value greater than or equal to 0 and less than 1). In this case, a value of beta may be defined to be a fixed value in the standard, or may be a value set from the network to the UE through RRC or the like.

[Uplink power control of DMRS bundle according to UE capability]

When the aforementioned method or the like is applied, transmit power information of the UE may be obtained in advance for a specific time duration with respect to an uplink signal/channel transmitted after a certain time according to UE capability. Such a UE is called a look-ahead power control capable UE, and a time duration in which the UE is capable of predict transmit power may be called a look-ahead power control capable time window. That is, if the look-ahead power control capable UE currently performs transmission in transmission of an i-th slot and if the look-ahead power control capable time window is n slots, the UE may obtain power control information in advance until an (i+n)-th slot. Power allocation for the DMRS bundle for the UE will be described below according to whether the UE has corresponding capability.

First, power allocation of a DMRS bundle of a UE having look-ahead power control capability is described.

Case 1) When the DMRS bundle is less than a look-ahead power control capable time window of the UE The UE may calculate available power for each slot in a DMRS bundle duration, and may configure transmit power equally in all slots/transmission occasions (in a corresponding bundle) according to minimum power thereof.

Figure 11:
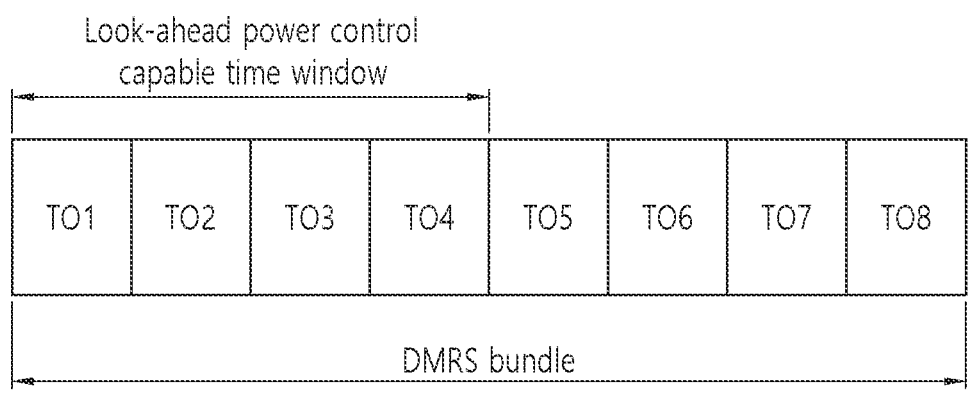
FIG. 11 illustrates an example of a case where the DMRS bundle is greater than the look-ahead power control capable window.

Case 2) When the DMRS bundle is greater than the look-ahead power control capable window of the UE FIG. 11 illustrates an example of a case where the DMRS bundle is greater than the look-ahead power control capable window. Referring to FIG. 11, the DMRS bundle consists of 8 TOs, and the look-ahead power control capable window of the UE consists of 4 slots.

In this situation, the look-ahead power control capable UE may consider the following two operations.

Option 1) The UE may request to change a DMRS bundle size so that the look-ahead power control capable time window and the DMRS bundle size are equal to each other or the DMRS bundle size is less than the look-ahead power control capable time window. Alternatively, the UE may report in advance whether a look-ahead power control is capable and a corresponding time window size or the like to the gNB, and, based on this, may expect that the DMRS bundle size is less than the look-ahead power control capable time window.

Option 2) The UE may operate by assuming the same case as the case 1. That is, since the UE knows minimum power P1 for a look-ahead power control capable duration, the UE may apply the minimum power, and may also equally apply the minimum power to the remaining TOs (TO5, TO6, TO7, TO8 of FIG. 11). However, among subsequent TOs, when transmit power less than the minimum power P1 is instructed or when an operation is to be performed based on power less than the minimum power, the UE may allocate power less than P1 only in the TO or may allocate P1 against the instructed operation. Alternatively, among the subsequent TOs, for a subsequent TO including a TO in which transmit power less than the minimum power P1 is instructed or in which an operation is to be performed based on power less than the minimum power, the UE performs transmission on all of them with the instructed transmit power and thus may not maintain power consistency.

Next, power allocation of a DMRS bundle of a look-ahead power control incapable UE will be described.

The UE may select a specific transmit power P1 in a bundle duration, and if available power in a subsequent slot is equal to P1 or is within a specific range based on P1, the UE may perform transmission in a corresponding slot with corresponding power, and otherwise, may drop transmission in the corresponding slot. The transmit power P1 may be transmit power instructed for a transmission occasion corresponding to a first slot in the bundle duration, or may be a value based on pre-agreement or based on transmittable power of the UE. Considering that the DMRS bundle has a purpose of extending uplink coverage through channel estimation performance enhancement, this value may be a value obtained by subtracting a pre-agreed value from configured maximum transmit power based on a power class of the UE or maximum transmittable power of the UE. In addition, a range in which the UE determines whether to drop transmission may be reported by the UE to the gNB according to UE capability, or may be a value which is known to the gNB and the UE through a pre-agreement.

[Timing Advance (TA) Command of DMRS Bundle]

When a slot boundary for a DMRS bundle is configured, a UE may not apply a TPC command of uplink power control in the slot boundary. That is, the UE may ignore the TPC command received in the slot boundary for the DMRS bundle, or may apply it after the slot boundary by performing accumulation in a corresponding duration instead of applying the TPC command in the slot boundary by determining that the accumulation for the TPC command is configured. For example, if a gNB configures slot indices 3 and 9 to the UE as the slot boundary for the DMRS bundle, the TPC command of the PUSCH/PUCCH, received in a time duration from the slot index 3 to the slot index 9, may be ignored by the UE or the TPC command from the slot index 3 to the slot index 9 may be accumulated and applied from a slot index 10.

In addition, the following two alternatives may be considered.

Alternative 4-1) The UE does not expect to receive the TPC command during the current time-domain window.

Alternative 4-2) If the UE receives the TPC command during the current time-domain window, the UE accumulates the received TPC command instead of applying the TPC command.

For the aforementioned method of applying the TPC, the UE may specifically consider the following aspects.

For a procedure for a PUSCH power control of the UE, the existing UE may use tpc-Accumulation of an information element (IE) of PUSCH-PowerControl to determine whether the TPC accumulation is enabled/disabled. When a corresponding value is set to be enabled, the UE may accumulate and apply the TPC command. Alternatively, when this field is absent, the UE may accumulate and apply the TPC command. That is, the UE may not apply the accumulation of the TPC command only when the tpc-Accumulation is set to be enabled.

For example, the UE may perform accumulation when the tpc-Accumulation is not provided. In addition, the UE does not perform accumulation when the tpc-Accumulation is provided.

When joint channel estimation is set to be enabled, according to the method of the alternative 4-1, the UE may expect that the TPC command is not received or may determine that the TPC command is always 0. Although the method is simply implemented, a power control targeted by the gNB may not be instantaneously performed. To solve this problem, a method in which the UE receives the TPC command during the joint channel estimation may be considered. However, power/phase consistency shall be maintained for the DMRS bundle, and two considerations are required as a specific method to achieve this. First, the same TPC command may be applied to all PUSCH transmissions except for a first PUSCH in the DMRS bundle. To achieve this, applying of the TPC command in the DMRS bundle by the method of the alternatives 5-1-1 and 5-1-2 may be considered. Second, a TPC command different from a previous PUSCH may be applied only to the first PUSCH transmission of the DMRS bundle. To achieve this, applying of the alternatives 5-2-1, 5-2-2, and 5-2-3 may be considered. The following method is described for the PUSCH, but the aforementioned methods may also be applied to the PUCCH.

Alternative 5-1) When the joint channel estimation is set to be enabled, the UE is expected not to receive TPC command or not to receive the TPC command.

Specifically, for a PUSCH transmitted after joint channel estimation or DMRS bundling is set to be enabled through RRC, the UE may determine that $f_{b,f,c}(i,l)$, which is a PUSCH power adjustment state 1 for a PUSCH transmission occasion i and an active uplink bandwidth b of a carrier f of a serving cell c, is always 0. When the joint channel estimation is set to be disabled through RRC or when the joint channel estimation is not set to the UE through RRC, the TPC command may be applied by the conventional method.

Alternatively, the UE may apply the TPC command received to be applied to a PUSCH transmitted after the joint channel estimation is set to be enabled, not in unit of a transmission occasion but in unit of a DMRS bundle. To this end, the TPC command for transmission of a PUSCH except for a first PUSCH among PUSCHs constituting the same DMRS bundle may be set to be equal to the previous PUSCH. As a method for this, alternatives 5-1-1 and 5-1-2 may be considered. To ensure power/phase consistency in the DMRS bundle, transmit power shall be changed due to the TPC command. However, applying of the TPC command may be considered for transmission of the first PUSCH among the PUSCHs constituting the DMRS bundle. Therefore, for a method of applying the TPC command for transmission of the first PUSCH among the PUSCHs constituting the DMRS bundle, alternatives 5-2-1, 5-2-2, and 5-2-3 may be considered.

Alternative 5-1-1) Regarding applying of the TPC command to the PUSCH, not the first transmitted PUSCH of the DMRS bundle, the UE may apply the TPC command of an immediately previous PUSCH.

$f_{b,f,c}(i,l)=f_{b,f,c}(i-1,l)$ may be applied when a transmission occasion i and a transmission occasion i−1 have a DMRS bundle relationship, or when it is set by the gNB to maintain power/phase consistency, or when the gNB expects that the transmission occasion i and a transmission occasion i−1 maintain power/phase consistency.

Alternative 5-1-2) The UE may change a set $c(D_i)$ accumulated to apply the TPC command to the PUSCH, not the first transmitted PUSCH of the DMRS bundle. Herein, $c(D_i)$ may be defined by the following table.

TABLE 9

$$\sum_{m=0}^{C(D_i)-1} \delta_{PUSCH,b,f,c}(m, l)$$

is a sum of TPC command values in a set D$i$ of TPC command values with cardinality C(D$i$) that the UE receives between K$_{PUSCH}$ ($i - i_0$) − 1 symbols before PUSCH transmission occasion $i - i_0$ and K$_{PUSCH}$ ($i$) symbols before PUSCH transmission occasion $i$ on active UL BWP $b$ of carrier $f$ of serving cell $C$ for PUSCH power control adjustment state $l$, where $i_0 > 0$ is the smallest integer for which K$_{PUSCH}$ ($i - i_0$) symbols before PUSCH transmission occasion $i - i_0$ is earlier than K$_{PUSCH}$ ($i$) symbols before PUSCH transmission occasion $i$ When a PUSCH from a transmission occasion i to a transmission occasion i+k has a DMRS bundle relationship, the UE may apply a TPC command of the transmission occasion i for transmission occasions from a transmission occasion i+1 to a transmission occasion i+k. That is, when the PUSCH from the transmission occasion i to the transmission occasion i+k has the DMRS relationship, if the UE is configured by the gNB to maintain power/phase consistency or if the gNB expects that power/phase consistency is to be maintained for the PUSCH from the transmission occasion i to the transmission occasion i+k, the UE may consider that $D_i$ is applied to all transmission occasions i+m greater than or equal to 1 and less than k. That is, the UE may assume that $D_i=D_{i+1}=\ldots=D_{i+k}$.

Alternative 5-2-1) For a TPC command applied to transmission of a first PUSCH among PUSCHs constituting the DMRS bundle, the UE may accumulate a received TPC command according to whether tpc-accumulation is enabled and $c(d_i)$ as in the conventional operation.

Alternative 5-2-2) The UE may be instructed not to accumulate all TPC commands applied to the transmission of the first PUSCH among the PUSCHs constituting the DMRS bundle. That is, a TPC of an absolute value may be applied to the transmission of the first PUSCH among the PUSCHs constituting the DMRS bundle. That is, the UE may determine that tpc-Accumulation is provided.

Alternative 5-2-3) For the TPC command applied to transmission of the first

PUSCH among the PUSCHs constituting the DMRS bundle, the UE may accumulate and apply all TPC commands received in a duration of the DMRS bundle. For this, a set $c(D_i)$ may be modified. An element consituting the set $c(D_i)$ may include $K_{PUSCH}(i)$ and $i_0$, where $i_0$ may be changed as follows.

The value $i_0$ may be fixed and used while joint channel estimation is set to be enabled through RRC. That is, the value $i_0$ may be set to the UE through RRC while joint channel estimation is set to be enabled through RRC. Alternatively, the value $i_0$ to be used may be instructed to the UE when joint channel estimation is set to be enabled through RRC according to a pre-agreement or negotiation.

A method of changing the value $i_0$ to an index indicating first PUSCH transmission of the DMRS bundle may be considered. That is, when joint channel estimation is set to be enabled, the UE may apply a smallest number indicating a first PUSCH transmission occasion of an immediately previous DMRS bundle for a transmission occasion i. In this case, if the immediately previous DMRS bundle is absent, that is, if it is transmission of a first DMRS bundle in which joint channel estimation is set, the existing value $i_0$ may be applied. Alternatively, when a distance of the first PUSCH transmission occasion of the immediately previous DMRS bundle is greater than or equal to a specific value, a fixed value may be used. That is, a maximum value of $i_0$ may be set.

The aforementioned method may also be applied extendedly to a case where the TPC accumulation is not set to be enabled. That is, when the accumulation of the TPC command is set, that is, when the UE is not provided with tpc-Accumulation or tpc-Accumulation is enabled, and when the accumulation is not applied, that is, when tpc-Accumulation is not enabled, if the aforementioned content is applied to a case where joint channel estimation is set to be enabled for the case where the accumulation of the TPC command is applied, the aforementioned content may also be applied extendedly to the case where the TPC accumulation is not applied.

Regarding the case where the TPC accumulation is not applied, an instructed TPC command may be additionally applied to a TPC command of a previous transmission occasion when it is accumulated, and an absolute value may be applied only to a corresponding transmission occasion when it is not accumulated. Therefore, according to the existing operation, the instructed TPC may be an event since power consistency is changed. Herein, the event may mean a specific situation which makes it impossible to guarantee power consistency and phase continuity for the DMRS bundle. Further, since it is applied only to the corresponding transmission occasion, transmit power of a transmission occasion in which a TCP command is instructed may be different before and after the instruction. Therefore, considering a time duration of the event, receiving/applying of the TPC command may be an event having a time duration of 1 slot. In this case, since there is no misunderstanding between the UE and the gNB at an applying time point of the TPC command, the receiving/applying of the TPC command may be a semi-static event. Alternatively, similarly to the accumulated TPC, even if a TPC command is instructed in a time domain window (TDW), improvement may be considered such as delaying of the applying of the TPC command. In this case, an operation of a case where two TPCs are instructed in the TDW may be ambiguous, and if the applying is delayed due to a start of a next TDW, it is applied as an absolute value only in a corresponding transmission occasion . Therefore, in this case, even if it is configured with an actual TDW, the time duration may also be 1 slot. If a length of the set TDW is equal to a length of the actual TDW in this case, the actual TDW may end at the same time of starting a first actual TDW in a newly set TDW. Therefore, rather than the improvement in this way, when joint channel estimation is set to be enabled, it may be treated that TPC is always accumulated, which may be simpler and result in no misunderstanding about a boundary of the TDW. That is, when the joint channel estimation is set to be enabled, the UE may consider the following two alternatives when the TPC accumulation is not applied.

Alternative 6-1) Applying of the TPC without accumulation is an event having a time duration of 1 slot.

Herein, the event in which the applying of the TPC without accumulation has a time duration of 1 slot may mean that the UE ends the actual TDW immediately previous to a time-domain slot in which the TPC without accumulation is expected to be applied. That is, it may mean that, when the UE in which joint channel estimation is set to be enabled is instructed to apply the TPC without accumulation in an n-th slot, the UE may end the actual TDW in at least an (n-1)-th slot and may start a new actual TDW from an n-th slot. Herein, the actual TDW may mean a consecutive slot index at which the actual UE is expected to perform transmission for a DMRS bundle, i.e., transmission in which phase continuity and power continuity are maintained.

Alternative 6-2) Setting of joint channel estimation to be enabled means that TPC accumulation is set to be enabled.

As in the method of the alternative 6-1, the changing of the applying time point of the TPC without accumulation may impair scheduling flexibility of the gNB. Therefore, when joint channel estimation is set to be enabled through RRC, the UE may determine that it is set to enable the TPC accumulation. That is, when the joint channel estimation is set to be enabled through RRC, the UE may determine that tpc-Accumulation is not provided or that tpc-Accumulation is set to be enabled.

Meanwhile, when the UE receives a TA command in an uplink slot n, the UE may perform adjustment of a corresponding uplink transmission timing at a start of an uplink slot n+k+1.

It may not be desirable in terms of joint channel estimation of the gNB to perform uplink timing adjustment in a DMRS bundle. Therefore, it may be desirable to maintain an uplink timing of the UE in the DMRS bundle.

Accordingly, in order to maintain the uplink timing in the DMRS bundle, the operation of the UE may be limited so that the UE performs uplink timing adjustment only when the first slot of the DMRS bundle starts. That is, the UE may perform the uplink timing adjustment in a first uplink slot constituting the DMRS bundle, and may not perform the uplink timing adjustment when the remaining uplink slots start.

To this end, the UE may specifically operate as follows. Upon receiving a TA command in an uplink slot n, the UE may perform adjustment of a corresponding uplink timing when a first slot of a nearest DMRS bundle starts after an uplink slot n+k+1. The operation may be applied when PUSCH/PUCCH transmission is repeatedly performed in the uplink slot n+k+1. If the uplink slot n+k+1 is located in a last DMRS bundle constituting the PUSCH/PUCCH repetition, the UE may perform uplink transmission timing adjustment for the TA command received in the uplink slot n when a next uplink slot starts after PUSCH/PUCCH repetition transmission ends.

In addition, the UE may not perform the TA adjustment in the time-domain window. To this end, the following alternative may be considered.

Alternative 7-1) When the applying time point of the TA adjustment instructed to the UE is after joint channel estimation is set to be enabled through RRC, it may be expected that the UE ignores the instructed TA adjustment or does not receive the TA adjustment.

Alternative 7-2) When the applying time point of the TA adjustment instructed to the UE is after joint channel estimation is set to be enabled through RRC, the UE may apply the instructed TA adjustment in preference to the time-domain window.

Since the UE performs the TA adjustment at the applying time point according to the existing operation and the gNB knows an exact TA adjustment applying time point of the UE, it may be expected that the UE does not maintain the time-domain window at a corresponding time. Alternatively, a boundary of the time-domain window may be changed as the UE applies the TA adjustment. Alternatively, for common understanding of the gNB and the UE, when there is a change in the boundary of the time-domain window based on the applying of the TA adjustment, the UE may report the change in the boundary to the gNB.

The UE may expect a change in a transmission characteristic of the UE as the boundary of the time-domain window changes according to the applying of the TA adjustment. That is, the UE may perform the TPC command or the like together at the applying time point of the TA adjustment.

That is, when the UE in which joint channel estimation is set to be enabled is instructed to apply the TA adjustment in the n-th slot, the UE may end an actual TDW in at least in the (n-1)-th slot, and may start a new actual TDW from the n-th slot. Herein, the actual TDW may mean a consecutive slot index at which the actual UE is expected to perform transmission for a DMRS bundle, i.e., transmission in which phase continuity and power continuity are maintained.

Alternative 7-3) When the applying time point of the TA adjustment instructed to the UE is after the joint channel estimation is set to be enabled through RRC, the UE may apply the instructed TA adjust differently from the existing applying time point.

According to the existing operation, the UE may apply the timing adjustment received in the uplink slot n at the start of the uplink slot n+k+1. However, in a state where joint channel estimation is set to be enabled, that is, when timing adjustment is applied to an uplink slot in which a time-domain window is configured, the applying time point of the timing adjustment may be changed as follows. When the uplink slot n+k and the uplink slot n+k+1 belong to the same time-domain window, the UE may apply timing adjustment to a start time point of a first uplink slot after the time-domain window ends.

In other words, when the uplink slot n+k and the uplink slot n+k+1 belong to the same time-domain window, adjustment corresponding to an uplink transmission timing may be applied to a start time point of a first uplink slot after the time-domain window.

Alternatively, it may be considered to change the value k. That is, for the applying time point, it may be considered that, if the UE is in a state where the joint channel estimation is set to be enabled through RRC, the UE may apply the TA adjustment by changing the value k, or may consider that a time-domain window is included in the value k. For example, it may be considered to change the existing definition of the value k as follows.

The existing definition of Equation 7 may be changed to Equation 8.

$$k = \lceil N_{slot}^{subframe\ \mu} \cdot (N_{T,1} + N_{T,2} + N_{TA,max} + 0.5)/T_{sf} \rceil \quad \text{[Equation 7]}$$

$$k = \lceil N_{slot}^{subframe\ \mu} \cdot (N_{T,1} + N_{T,2} + N_{TA,max} + 0.5)/T_{sf} \rceil + \gamma \quad \text{[Equation 8]}$$

Herein, $\gamma$ denotes the minimum number of slots indicating a first slot of the time-domain window. $\gamma$ may be a value greater than or equal to 0 and less than TDW. TDW may be a time-domain window when joint channel estimation is set to be enabled. $\gamma$ may be 0 o when the joint channel estimation is disabled.

Alternative 7-4) When the applying time point of the TA adjustment instructed to the UE is after the joint channel estimation is set to be enabled through RRC, the UE may determine whether the TA adjustment is performed according to a value of the instructed TA adjustment.

When the value of the instructed TA adjustment is greater than or equal to a specific value k according to a pre-agreement or the like, the UE may perform the TA adjustment, and when the value is less than k, the UE may not perform the TA adjustment.

Alternatively, when the instructed TA adjustment is greater than or equal to the specific value k, the UE may apply the TA adjustment in preference to the time-domain window, and when the TA adjustment is less than or equal to the specific value k, the UE may not perform the TA adjustment, or may change the applying time point of the instructed TA adjustment preferentially for the time-domain window.

Applying of the TA adjustment by the UE in preference to the time-domain window according to the aforementioned method of the like may mean that the UE applies the TA adjustment to the instructed time-domain window or within a time duration in which the gNB expects that the UE will apply the time-domain window in an implicit manner. This means that time/phase consistency which is a requirement of the time-domain window is not maintained, and thus the UE may report to the gNB that the time-domain window is not maintained. For the applying time point of the timing adjustment, the aforementioned method of the alternative 7-3 may be applied.

In addition, the specific value k may be a fixed value based on a pre-agreement, and may be a value determined based on a cyclic prefix (CP) length. That is, the UE in which transmission is performed by setting joint channel estimation to be enabled may calculate a specific value from a parameter cyclicPrefix indicated by an uplink BWP, and may determine whether to apply the instructed TA adjustment based on this.

In addition, discussion on UE autonomous adjustment is required. Herein,

TA adjustment and UE uplink timing autonomous adjustment may cause a phase change. In addition, it is required to define the UE uplink timing autonomous adjustment and to define an applying timing.

Herein, when the received downlink timing is changed and is not compensated or when it is compensated only partially by the uplink timing adjustment without the timing advance command, the UE may change $N_{TA}$(timing advance of MAC-CE or RAR) according thereto.

Therefore, since the UE autonomous adjustment causes a phase change, two cases may be considered for an applying time point. The applying time point of the UE autonomous adjustment may be defined in a standard or the like. Alternatively, when the UE autonomous adjustment is executed in a state where joint channel estimation is set to be enabled, the UE may report an execution time point to the gNB. That is, when actual TDW ends due to the UE autonomous TA adjustment, the UE may report this. Since it is inefficient to define all applying time points of UE autonomous coordination, it may be desirable to adopt the latter method. That is, when the actual TDW ends due to UE autonomous TA adjustment in a state where joint channel estimation is set to be enabled, the UE may at least report the end of the actual TDW.

In addition, according to the existing standard, when two adjacent slots overlap due to the TA command, a duration of the latter slot may be reduced compared to the former slot. Therefore, when the TA adjustment is executed at the TDW boundary or is treated as an event, a length of a slot located at a later position on a time domain may be reduced according to the TA adjustment. Herein, since how the slot located at the later position is reduced is not clearly defined, a method thereof needs to be defined. That is, a first symbol of a slot to be reduced may be decreased, or a last symbol of the slot may be decreased. In all cases, there is a need to define whether the slot to be decreased is included in a TDW. As a simple method, the slot to be decreased may not be included in the TDW. Two methods in which the slot to be decreased is included in the TDW may be considered. First, it may be treated/assumed that the first symbol of the decreased slot does not exist. Second, it may be treated/assumed that the last symbol does not exist. When the first symbol is removed, if a PUSCH is transmitted in the slot and is included in the TDW, a start point of the actual TDW needs to be newly defined. That is, it may be expected that, when joint channel estimation is set to be enabled, the UE is instructed to perform TA adjustment at an n-th slot, and when an (n+1)-th slot is decreased due to the instruction, the n-th slot and the (n+1)-th slot do not construct one DMRS bundle. That is, if the n-th slot and an (n−1)-th slot have a DMRS bundle relationship, the UE may determine that the DMRS bundle ends even if there is no instruction of the gNB at the n-th slot.

Regarding a window duration for joint channel estimation or a duration in which the DMRS bundle is configured, if a condition of cases described below is satisfied for a corresponding duration or irrespective of a corresponding window duration, the UE may change transmit power, a transmission timing, a transmission pre-coder, or the like. That is, if the following condition is satisfied, the UE may set a signal characteristic (e.g., a modulation order, a phase, power, a precoder, a transmission timing, etc.) expected to be identical between a current transmission occasion and an immediately previous transmission occasion for the purpose of joint channel estimation. Operations described below may be performed when one or a plurality of conditions are satisfied.

Case 1) When separated by at least a specific time from an immediately previous transmission occasion When N or more slots in which transmission is not performed are present between the i-th uplink transmission occasion of the UE and the (i−1)-th uplink transmission occasion, the UE may configure the transmit power, timing, precoder, transmission timing, or the like of the i-th transmission occasion differently from the power, timing, precoder, transmission timing, or the like of the (i−1)-th transmission occasion. Herein, the value N may be set to RRC/MAC-CE/DCI, or the like in the UE according to a pre-negotiation, or may be determined to a value based on UE capability.

Case 2) When a downlink symbol or slot is present between uplink transmission occasions When the UE receives a downlink signal between the i-th uplink transmission occasion and an N-th uplink transmission occasion nearest to the i-th uplink transmission occasion, i.e., an (i+N)-th uplink transmission occasion, or is instructed to perform monitoring in a specific slot/symbol for the purpose of receiving a downlink signal, or is expected to perform monitoring in the specific slot/symbol for the purpose of receiving the downlink signal, the UE may set a modulation order, a phase, power, a precoder, a transmission timing, or the like differently for a duration from a last symbol of transmission of the i-th uplink transmission occasion to a previous symbol of a first symbol of the (i+N)-th uplink transmission occasion.

Case 3) When uplink transmission is performed, except for an uplink for joint channel estimation, or when instructed to perform another uplink transmission The UE may perform joint channel estimation for a specific CC in which CA/DC is performed. When an i-th uplink transmission occasion collides with uplink transmission of another component carrier (CC) or when transmit power of the i-th uplink transmission occasion in which joint channel estimation is performed needs to be decreased according to the conventional method due to the occurrence of collision, the UE may set a modulation order, a phase, power, a precoder, a transmission timing, or the like differently for a corresponding transmission occasion. Alternatively, if the UE performs a single-cell operation not in a CA/DC situation, when transmission of another uplink signal is configured in a current CC, not uplink transmission aiming at joint channel estimation, the UE may set a modulation order, a phase, power, a precoder, a transmission timing, or the like differently for a corresponding transmission occasion.

Case 4) When instructed to change a transmission PRB position of an uplink transmission occasion Due to inter-frequency hopping or intra-frequency hopping or the like, according to the conventional method or a frequency hopping method improved for the purpose of joint channel estimation or the like, it may be expected that a PRB is different between (i−1)-th transmission and i-th transmission or the UE may be instructed to transmit another PRB or configured to change an uplink BWP. In this case, the UE may perform transmission by configuring the transmit power, timing, precoder, transmission timing, or the like of the i-th transmission occasion differently from the power, timing, precoder, transmission timing, or the like of the (i−1)-th transmission occasion.

Case 5) When a TA command is received or when an applying time point of the TA command arrives When the UE receives the TA command in an i-th slot or is configured to apply the TA command in the i-th slot or symbol or when it is expected to apply the TA command in the i-th slot or symbol, the UE may perform transmission by changing transmit power, a timing, a precoder, or the like.

Regarding a time duration in which a specific transmission parameter such as a timing, power, a phase, a precoder, or the like is designated to be identical or to have at least a specific similarity, or even if it is not designated, it is expected to be identical or to have at least the specific similarity, if it corresponds to the case 1 to the case 5 or the like, the UE may not maintain the transmission parameters.

Figure 12:
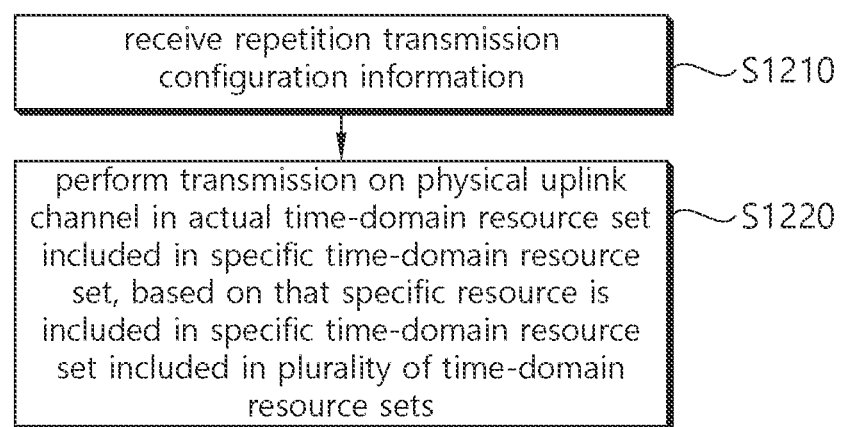
FIG. 12 illustrates an example of an uplink transmission method of a UE according to some implementations of the present specification.

Hereinafter, various embodiments proposed in the present specification are described. FIG. 12 illustrates an example of an uplink transmission method of a UE according to some implementations of the present specification.

The UE receives repetition transmission configuration information (S1210). The repetition transmission configuration information may be information for configuring repetition transmission for a physical uplink channel to the UE. The repetition transmission configuration information may report a plurality of time-domain resource sets in which the repetition transmission is performed. Each of the plurality of time-domain resource sets may be configured repeatedly in a time domain, based on the repetition transmission configuration information.

When a specific resource is included in a specific time-domain resource set included in the plurality of time-domain resource sets, the UE performs repetition transmission on the physical uplink channel in an actual time-domain resource set included in the specific time-domain resource set (S1220). The physical uplink channel may be at least one of a PUCCH and a PUSCH.

Herein, the specific resource may be a resource which cannot be used by the UE. Alternatively, the specific resource may be a resource in which an event occurs. The event may be pre-defined. The event may be an operation of determining that the channel characteristic cannot be maintained. For example, timing adjustment based on a TA command transmitted by a BS to the UE may be defined by the event. That is, the specific resource may include a resource in which the UE receives the TA command from the BS.

In addition, the actual time-domain resource set may start from a resource (e.g., a symbol) immediately subsequent to the specific resource on a time domain. The actual time-domain resource set may end at a last resource configured as the specific time-domain resource set on the time domain. Alternatively, the actual time-domain resource set may end at a resource immediately previous to another specific resource among resources configured as the specific time-domain resource set.

Herein, for example, the plurality of time-domain resource sets may be configured for transmission of a DMRS bundle. A resource configured through the DMRS bundle may be configured to have the same channel characteristic or to be included within a specific range. Herein, for a specific transmission occasion of the UE, the DMRS bundle may mean a time-axis duration of an aggregation of two or more such transmission occasions if a channel characteristic such as a phase, transmit power, physical resource block (PRB), modulation order, transmission timing, or the like is expected to be the same as, or to have at least a specific level of similarity with, that of another transmission occasion in which the UE performs transmission, or if it is instructed to maintain the same or at least the specific level of similarity. Alternatively, for transmission occasions of pre-agreed specific durations, the DMRS bundle may mean a time-axis duration of such transmission occasions if a phase, transmit power, PRB, modulation order, transmission timing, or the like is expected to be the same, or to have at least a specific level of similarity, or if it is instructed to maintain the same or at least the specific level of similarity.

Herein, each of the plurality of time-domain resource sets for the DMRS bundle may be named a configured time domain window (TDW). In addition, when the specific resource is present in the configured TDW, the UE may transmit the DMRS bundle on an actual TDW. In this case, the actual TDW may be the same as the actual time-domain resource set.

Figure 13:
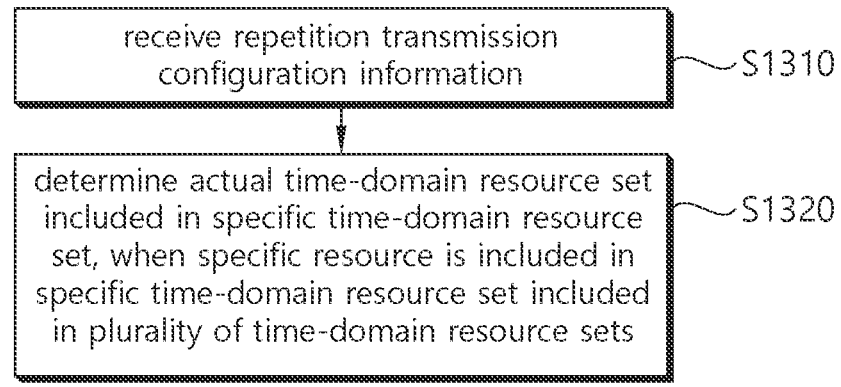
FIG. 13 illustrates an example of a timing advance (TA) adjustment method of a UE according to some implementations of the present specification.

FIG. 13 illustrates an example of a timing advance (TA) adjustment method of a UE according to some implementations of the present specification.

The UE receives repetition transmission configuration information (S1310). The repetition transmission configuration information may be information for configuring repetition transmission for a physical uplink channel to the UE. The repetition transmission configuration information may report a plurality of time-domain resource sets in which the repetition transmission is performed. Each of the plurality of time-domain resource sets may be configured repeatedly in a time domain, based on the repetition transmission configuration information. In addition, the physical uplink channel may be at least one of a PUCCH and a PUSCH.

When a specific resource is included in a specific time-domain resource set included in the plurality of time-domain resource sets, the UE determines an actual time-domain resource set included in the specific time-domain resource set (S1320). Herein, the specific resource may be a resource which cannot be used by the UE. Alternatively, the specific resource may be a resource in which an event occurs. The event may be pre-defined. The event may be an operation of determining that the channel characteristic cannot be maintained. For example, timing adjustment based on a TA command transmitted by a BS to the UE may be defined by the event. That is, the specific resource may include a resource in which the UE receives the TA command from the BS.

Herein, the UE may determine whether to perform UE autonomous TA adjustment. The UE autonomous TA adjustment may mean TA adjustment performed by the UE when the UE does not receive the TA command from the BS. When a specific condition is satisfied, the UE may perform the UE autonomous TA adjustment. For example, when a timing difference between an uplink resource and a downlink resource on a time domain is greater than a threshold, the UE may perform the UE autonomous TA adjustment.

Herein, even if the UE determines that the UE autonomous TA adjustment is necessary, the UE may not perform the UE autonomous TA adjustment in the actual time-domain resource set. For example, if the UE determines that the UE autonomous TA adjustment is necessary in the actual time-domain resource, the UE may not perform the UE autonomous TA adjustment in the actual time-domain resource set, and my perform the UE autonomous TA adjustment when the actual time-domain resource set ends.

Figure 14:
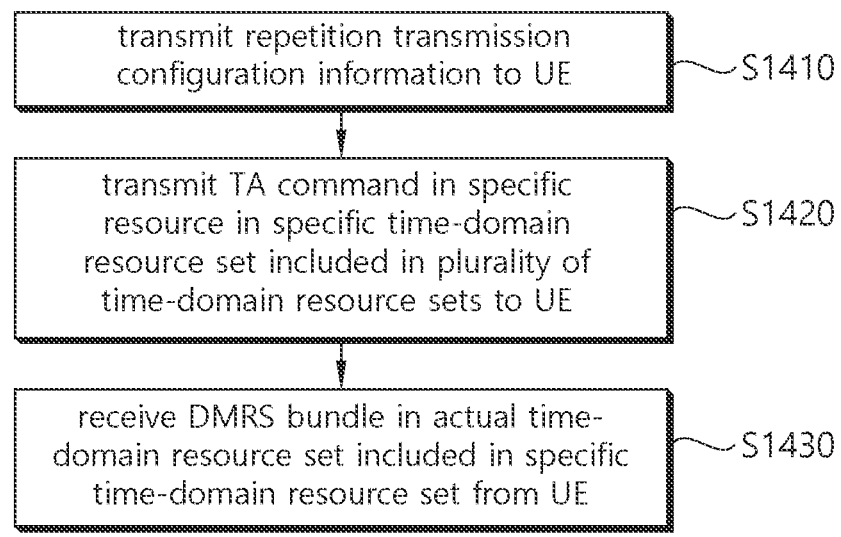
FIG. 14 illustrates an example of a method of configuring repetition transmission of a UE, performed by a BS, according to some implementations of the present specification.

FIG. 14 illustrates an example of a method of configuring repetition transmission of a UE, performed by a BS, according to some implementations of the present specification.

Referring to FIG. 14, the BS transmits repetition transmission configuration information to the UE (S1410). The repetition transmission configuration information may be information for configuring repetition transmission for a physical uplink channel to the UE. The repetition transmission configuration information may report a plurality of time-domain resource sets in which the repetition transmission is performed. Each of the plurality of time-domain resource sets may be configured repeatedly in a time domain, based on the repetition transmission configuration information. In addition, the physical uplink channel may be at least one of a PUCCH and a PUSCH.

The BS transmits to the UE a timing advance (TA) command in a specific resource in a specific time-domain resource set included in the plurality of time-domain resource sets (S1420). Herein, for example, the plurality of time-domain resource sets may be configured for transmission of the DMRS bundle. Herein, for a specific transmission occasion of the UE, the DMRS bundle may mean a time-axis duration of an aggregation of two or more such transmission occasions if a channel characteristic such as a phase, transmit power, physical resource block (PRB), modulation order, transmission timing, or the like is expected to be the same as, or to have at least a specific level of similarity with, that of another transmission occasion in which the UE performs transmission, or if it is instructed to maintain the same or at least the specific level of similarity. Alternatively, for transmission occasions of pre-agreed specific durations, the DMRS bundle may mean a time-axis duration of such transmission occasions if a phase, transmit power, PRB, modulation order, transmission timing, or the like is expected to be the same, or to have at least a specific level of similarity, or if it is instructed to maintain the same or at least the specific level of similarity.

The BS receives from the UE a DMRS bundle in an actual time-domain resource set included in the specific time-domain resource set (S1430). Herein, a timing at which the DMRS bundle is transmitted is a timing at which TA adjustment based on the TA command is not applied.

Methods proposed in the present specification may be performed by not only a UE but also at least one computer readable medium, which includes an instruction to be executed by at least one processor, and an apparatus configured to control the UE, which includes one or more processors and one or more memoires operatively coupled by the one or more processors and storing instructions. Herein, the one or more processors execute the instructions to perform the methods proposed in the present specification. In addition, according to the methods proposed in the present specification, it is obvious that an operation based on a BS corresponding to an operation performed by the UE is also considered.

Hereinafter, an example of a communication system to which the disclosure is applied is described.

Various descriptions, functions, procedures, proposals, methods, and/or operational flowcharts disclosed herein may be applied to, but not limited to, various fields requiring wireless communication/connection (e.g., 5G) between devices.

Hereinafter, specific examples are illustrated with reference to drawings. In the following drawings/description, unless otherwise indicated, like reference numerals may refer to like or corresponding hardware blocks, software blocks, or functional blocks.

Figure 15:
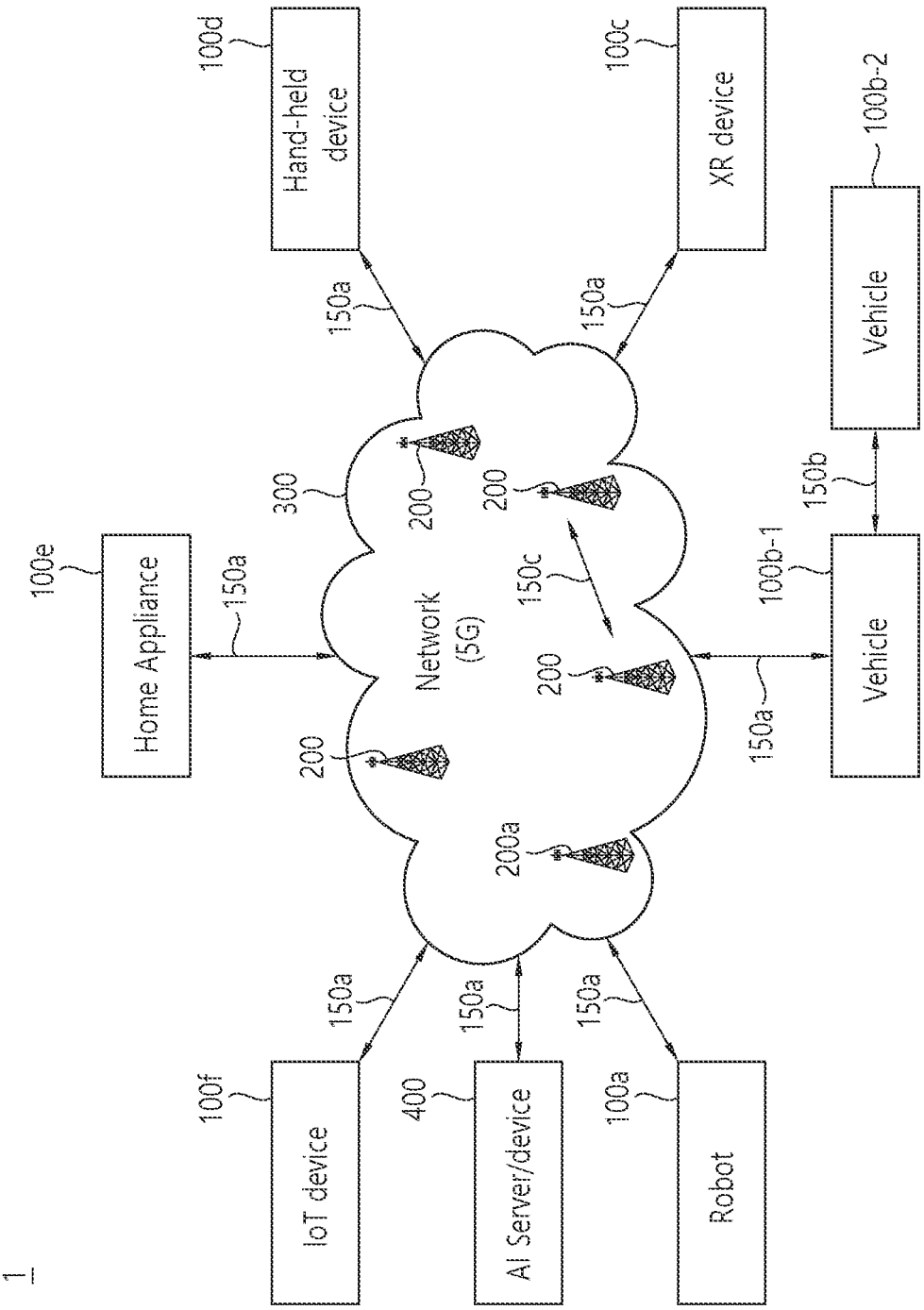
FIG. 15 illustrates a communication system 1 applied to the disclosure.

FIG. 15 illustrates a communication system 1 applied to the disclosure.

Referring to FIG. 15, the communication system 1 applied to the disclosure includes a wireless device, a base station, and a network. Here, the wireless device refers to a device that performs communication using a radio access technology (e.g., 5G new RAT (NR) or Long-Term Evolution (LTE)) and may be referred to as a communication/wireless/5G device. The wireless device may include, but limited to, a robot 100*a*, a vehicle 100*b*-1 and 100*b*-2, an extended reality (XR) device 100*c*, a hand-held device 100*d*, a home appliance 100*e*, an Internet of things (IoT) device 100*f*, and an AI device/server 400. For example, the vehicle may include a vehicle having a wireless communication function, an autonomous driving vehicle, a vehicle capable of inter-vehicle communication, or the like. Here, the vehicle may include an unmanned aerial vehicle (UAV) (e.g., a drone). The XR device may include augmented reality (AR)/virtual reality (VR)/mixed reality (MR) devices and may be configured as a head-mounted device (HMD), a vehicular head-up display (HUD), a television, a smartphone, a computer, a wearable device, a home appliance, digital signage, a vehicle, a robot, or the like. The hand-held device may include a smartphone, a smartpad, a wearable device (e.g., a smart watch or smart glasses), and a computer (e.g., a notebook). The home appliance may include a TV, a refrigerator, a washing machine, and the like. The IoT device may include a sensor, a smart meter, and the like. The base station and the network may be configured, for example, as wireless devices, and a specific wireless device 200*a* may operate as a base station/network node for other wireless devices.

Here, the wireless communication technology implemented in the wireless device of the present disclosure may include a narrowband Internet of Things for low-power communication as well as LTE, NR, and 6G. At this time, for example, NB-IoT technology may be an example of low power wide area network (LPWAN) technology, and may be implemented in standards such as LTE Cat NB1 and/or LTE Cat NB2, may be implemented in the standard of LTE Cat NB1 and/or LTE Cat NB2, and is not limited to the names mentioned above. Additionally or alternatively, the wireless communication technology implemented in the wireless device of the present disclosure may perform communication based on LTE-M technology. In this case, as an example, the LTE-M technology may be an example of an LPWAN technology, and may be called by various names such as enhanced machine type communication (eMTC). For example, LTE-M technology may be implemented by at least any one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the names described above. Additionally or alternatively, the wireless communication technology implemented in the wireless device of the present disclosure may include at least one of ZigBee, Bluetooth, and LPWAN considering low power communication and is not limited to the names described above. For example, the ZigBee technology may create personal area networks (PAN) related to small/low-power digital communication based on various standards such as IEEE 802.15.4, and may be called by various names.

The wireless devices 100*a* to 100*f* may be connected to the network 300 through the base station 200. Artificial intelligence (AI) technology may be applied to the wireless devices 100*a* to 100*f*, and the wireless devices 100*a* to 100*f* may be connected to an AI server 400 through the network 300. The network 300 may be configured using a 3G network, a 4G (e.g., LTE) network, or a 5G (e.g., NR) network. The wireless devices 100*a* to 100*f* may communicate with each other via the base station 200/network 300 and may also perform direct communication (e.g. sidelink communication) with each other without passing through the base station/network. For example, the vehicles 100*b*-1 and 100b-2 may perform direct communication (e.g. vehicle-to-vehicle (V2V)/vehicle-to-everything (V2X) communication). Further, the IoT device (e.g., a sensor) may directly communicate with another IoT device (e.g., a sensor) or another wireless device 100a to 100f.

Wireless communications/connections 150a, 150b, and 150c may be established between the wireless devices 100a to 100f and the base station 200 and between the base stations 200. Here, the wireless communications/connections may be established by various wireless access technologies (e.g., 5G NR), such as uplink/downlink communication 150a, sidelink communication 150b (or D2D communication), and inter-base station communication 150c (e.g., relay or integrated access backhaul (IAB)). The wireless devices and the base station/wireless devices, and the base stations may transmit/receive radio signals to/from each other through the wireless communications/connections 150a, 150b, and 150c. For example, the wireless communications/connections 150a, 150b, and 150c may transmit/receive signals over various physical channels. To this end, at least some of various configuration information setting processes, various signal processing processes (e.g., channel encoding/decoding, modulation/demodulation, resource mapping/demapping, and the like), and resource allocation processes may be performed on the basis of various proposals of the disclosure.

Figure 16:
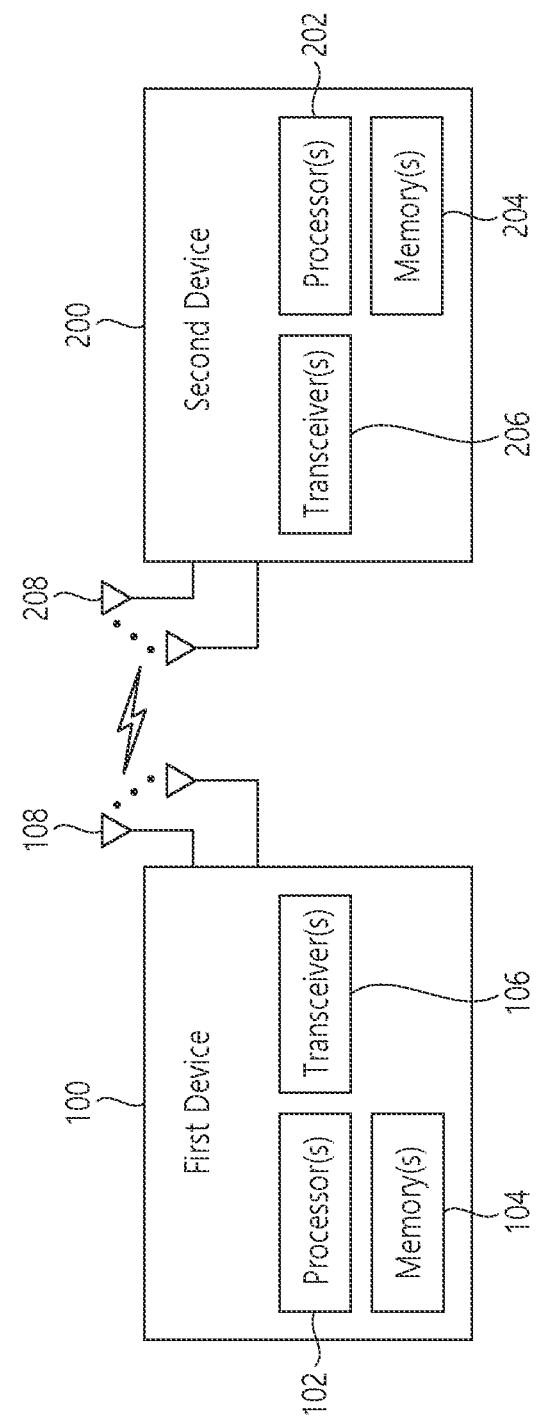
FIG. 16 illustrates a wireless device that is applicable to the disclosure.

FIG. 16 illustrates a wireless device that is applicable to the disclosure.

Referring to FIG. 16, a first wireless device 100 and a second wireless device 200 may transmit and receive radio signals through various radio access technologies (e.g., LTE and NR). Here, the first wireless device 100 and the second wireless device 200 may respectively correspond to a wireless device 100x and the base station 200 of FIG. 15 and/or may respectively correspond to a wireless device 100x and a wireless device 100x of FIG. 15.

The first wireless device 100 includes at least one processor 102 and at least one memory 104 and may further include at least one transceiver 106 and/or at least one antenna 108. The processor 102 may be configured to control the memory 104 and/or the transceiver 106 and to implement the descriptions, functions, procedures, proposals, methods, and/or operational flowcharts disclosed herein. For example, the processor 102 may process information in the memory 104 to generate first information/signal and may then transmit a radio signal including the first information/signal through the transceiver 106. In addition, the processor 102 may receive a radio signal including second information/signal through the transceiver 106 and may store information obtained from signal processing of the second information/signal in the memory 104. The memory 104 may be connected to the processor 102 and may store various pieces of information related to the operation of the processor 102. For example, the memory 104 may store a software code including instructions to perform some or all of processes controlled by the processor 102 or to perform the descriptions, functions, procedures, proposals, methods, and/or operational flowcharts disclosed herein. Here, the processor 102 and the memory 104 may be part of a communication modem/circuit/chip designed to implement a radio communication technology (e.g., LTE or NR). The transceiver 106 may be connected with the processor 102 and may transmit and/or receive a radio signal via the at least one antennas 108. The transceiver 106 may include a transmitter and/or a receiver. The transceiver 106 may be replaced with a radio frequency (RF) unit. In the disclosure, the wireless device may refer to a communication modem/circuit/chip.

The second wireless device 200 includes at least one processor 202 and at least one memory 204 and may further include at least one transceiver 206 and/or at least one antenna 208. The processor 202 may be configured to control the memory 204 and/or the transceiver 206 and to implement the descriptions, functions, procedures, proposals, methods, and/or operational flowcharts disclosed herein. For example, the processor 202 may process information in the memory 204 to generate third information/signal and may then transmit a radio signal including the third information/signal through the transceiver 206. In addition, the processor 202 may receive a radio signal including fourth information/signal through the transceiver 206 and may store information obtained from signal processing of the fourth information/signal in the memory 204. The memory 204 may be connected to the processor 202 and may store various pieces of information related to the operation of the processor 202. For example, the memory 204 may store a software code including instructions to perform some or all of processes controlled by the processor 202 or to perform the descriptions, functions, procedures, proposals, methods, and/or operational flowcharts disclosed herein. Here, the processor 202 and the memory 204 may be part of a communication modem/circuit/chip designed to implement a radio communication technology (e.g., LTE or NR). The transceiver 206 may be connected with the processor 202 and may transmit and/or receive a radio signal via the at least one antennas 208. The transceiver 206 may include a transmitter and/or a receiver. The transceiver 206 may be replaced with an RF unit. In the disclosure, the wireless device may refer to a communication modem/circuit/chip.

Hereinafter, hardware elements of the wireless devices 100 and 200 are described in detail. At least one protocol layer may be implemented, but limited to, by the at least one processor 102 and 202. For example, the at least one processor 102 and 202 may implement at least one layer (e.g., a functional layer, such as PHY, MAC, RLC, PDCP, RRC, and SDAP layers). The at least one processor 102 and 202 may generate at least one protocol data unit (PDU) and/or at least one service data unit (SDU) according to the descriptions, functions, procedures, proposals, methods, and/or operational flowcharts disclosed herein. The at least one processor 102 and 202 may generate a message, control information, data, or information according to the descriptions, functions, procedures, proposals, methods, and/or operational flowcharts disclosed herein. The at least one processor 102 and 202 may generate a signal (e.g., a baseband signal) including a PDU, an SDU, a message, control information, data, or information according to the functions, procedures, proposals, and/or methods disclosed herein and may provide the signal to the at least one transceiver 106 and 206. The at least one processor 102 and 202 may receive a signal (e.g., a baseband signal) from the at least one transceiver 106 and 206 and may obtain a PDU, an SDU, a message, control information, data, or information according to the descriptions, functions, procedures, proposals, methods, and/or operational flowcharts disclosed herein.

The at least one processor 102 and 202 may be referred to as a controller, a microcontroller, a microprocessor, or a microcomputer. The at least one processor 102 and 202 may be implemented by hardware, firmware, software, or a combination thereof. For example, at least one application-specific integrated circuit (ASIC), at least one digital signal processor (DSP), at least one digital signal processing devices (DSPD), at least one programmable logic devices (PLD), or at least one field programmable gate array (FPGA)

may be included in the at least one processor 102 and 202. The descriptions, functions, procedures, proposals, methods, and/or operational flowcharts disclosed herein may be implemented using firmware or software, and the firmware or software may be configured to include modules, procedures, functions, and the like. The firmware or software configured to perform the descriptions, functions, procedures, proposals, methods, and/or operational flowcharts disclosed herein may be included in the at least one processor 102 and 202 or may be stored in the at least one memory 104 and 204 and may be executed by the at least one processor 102 and 202. The descriptions, functions, procedures, proposals, methods, and/or operational flowcharts disclosed herein may be implemented in the form of a code, an instruction, and/or a set of instructions using firmware or software.

The at least one memory 104 and 204 may be connected to the at least one processor 102 and 202 and may store various forms of data, signals, messages, information, programs, codes, indications, and/or commands. The at least one memory 104 and 204 may be configured as a ROM, a RAM, an EPROM, a flash memory, a hard drive, a register, a cache memory, a computer-readable storage medium, and/or a combinations thereof. The at least one memory 104 and 204 may be disposed inside and/or outside the at least one processor 102 and 202. In addition, the at least one memory 104 and 204 may be connected to the at least one processor 102 and 202 through various techniques, such as a wired or wireless connection.

The at least one transceiver 106 and 206 may transmit user data, control information, a radio signal/channel, or the like mentioned in the methods and/or operational flowcharts disclosed herein to at least different device. The at least one transceiver 106 and 206 may receive user data, control information, a radio signal/channel, or the like mentioned in the descriptions, functions, procedures, proposals, methods, and/or operational flowcharts disclosed herein from at least one different device. For example, the at least one transceiver 106 and 206 may be connected to the at least one processor 102 and 202 and may transmit and receive a radio signal. For example, the at least one processor 102 and 202 may control the at least one transceiver 106 and 206 to transmit user data, control information, or a radio signal to at least one different device. In addition, the at least one processor 102 and 202 may control the at least one transceiver 106 and 206 to receive user data, control information, or a radio signal from at least one different device. The at least one transceiver 106 and 206 may be connected to the at least one antenna 108 and 208 and may be configured to transmit or receive user data, control information, a radio signal/channel, or the like mentioned in the descriptions, functions, procedures, proposals, methods, and/or operational flowcharts disclosed herein through the at least one antenna 108 and 208. In this document, the at least one antenna may be a plurality of physical antennas or may be a plurality of logical antennas (e.g., antenna ports). The at least one transceiver 106 and 206 may convert a received radio signal/channel from an RF band signal into a baseband signal in order to process received user data, control information, a radio signal/channel, or the like using the at least one processor 102 and 202. The at least one transceiver 106 and 206 may convert user data, control information, a radio signal/channel, or the like, processed using the at least one processor 102 and 202, from a baseband signal to an RF bad signal. To this end, the at least one transceiver 106 and 206 may include an (analog) oscillator and/or a filter.

Figure 17:
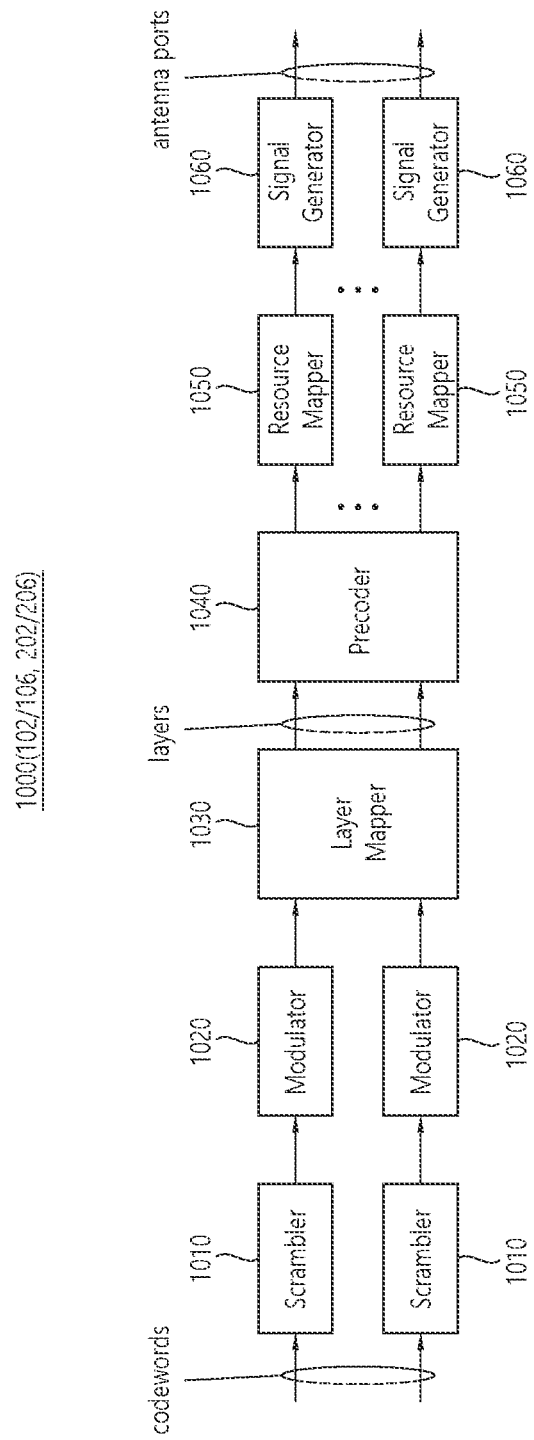
FIG. 17 illustrates a signal processing circuit for a transmission signal.

FIG. 17 illustrates a signal processing circuit for a transmission signal.

Referring to FIG. 17, the signal processing circuit 1000 may include a scrambler 1010, a modulator 1020, a layer mapper 1030, a precoder 1040, a resource mapper 1050, and a signal generator 1060. Operations/functions illustrated with reference to FIG. 17 may be performed, but not limited to, in the processor 102 and 202 and/or the transceiver 106 and 206 of FIG. 16. Hardware elements illustrated in FIG. 17 may be configured in the processor 102 and 202 and/or the transceiver 106 and 206 of FIG. 16. For example, blocks 1010 to 1060 may be configured in the processor 102 and 202 of FIG. 16. Alternatively, blocks 1010 to 1050 may be configured in the processor 102 and 202 of FIG. 16, and a block 1060 may be configured in the transceiver 106 and 206 of FIG. 16.

A codeword may be converted into a radio signal via the signal processing circuit 1000 of FIG. 17. Here, the codeword is an encoded bit sequence of an information block. The information block may include a transport block (e.g., a UL-SCH transport block and a DL-SCH transport block). The radio signal may be transmitted through various physical channels (e.g., a PUSCH or a PDSCH).

Specifically, the codeword may be converted into a scrambled bit sequence by the scrambler 1010. A scrambled sequence used for scrambling is generated on the basis of an initialization value, and the initialization value may include ID information about a wireless device. The scrambled bit sequence may be modulated into a modulation symbol sequence by the modulator 1020. A modulation scheme may include pi/2-binary phase shift keying (pi/2-BPSK), m-phase shift keying (m-PSK), m-quadrature amplitude modulation (m-QAM), and the like. A complex modulation symbol sequence may be mapped to at least one transport layer by the layer mapper 1030. Modulation symbols of each transport layer may be mapped to a corresponding antenna port(s) by the precoder 1040 (precoding). Output z from the precoder 1040 may be obtained by multiplying output y from the layer mapper 1030 by a precoding matrix W of N*M, where N is the number of antenna ports, and M is the number of transport layers. Here, the precoder 1040 may perform precoding after performing transform precoding (e.g., DFT transform) on complex modulation symbols. Alternatively, the precoder 1040 may perform precoding without performing transform precoding.

The resource mapper 1050 may map a modulation symbol of each antenna port to a time-frequency resource. The time-frequency resource may include a plurality of symbols (e.g., CP-OFDMA symbols or DFT-s-OFDMA symbols) in the time domain and may include a plurality of subcarriers in the frequency domain. The signal generator 1060 may generate a radio signal from mapped modulation symbols, and the generated radio signal may be transmitted to another device through each antenna. To this end, the signal generator 1060 may include an inverse fast Fourier transform (IFFT) module, a cyclic prefix (CP) inserter, a digital-to-analog converter (DAC), a frequency upconverter, and the like.

A signal processing procedure for a received signal in a wireless device may be performed in the reverse order of the signal processing procedure 1010 to 1060 of FIG. 17. For example, a wireless device (e.g., 100 and 200 of FIG. 16) may receive a radio signal from the outside through an antenna port/transceiver. The received radio signal may be converted into a baseband signal through a signal reconstructor. To this end, the signal reconstructor may include a frequency downconverter, an analog-to-digital converter (ADC), a CP remover, and a fast Fourier transform (FFT) module. The baseband signal may be reconstructed to a codeword through resource demapping, postcoding, demodulation, and descrambling. The codeword may be reconstructed to an original information block through decoding. Thus, a signal processing circuit (not shown) for a received signal may include a signal reconstructor, a resource demapper, a postcoder, a demodulator, a descrambler and a decoder.

Figure 18:
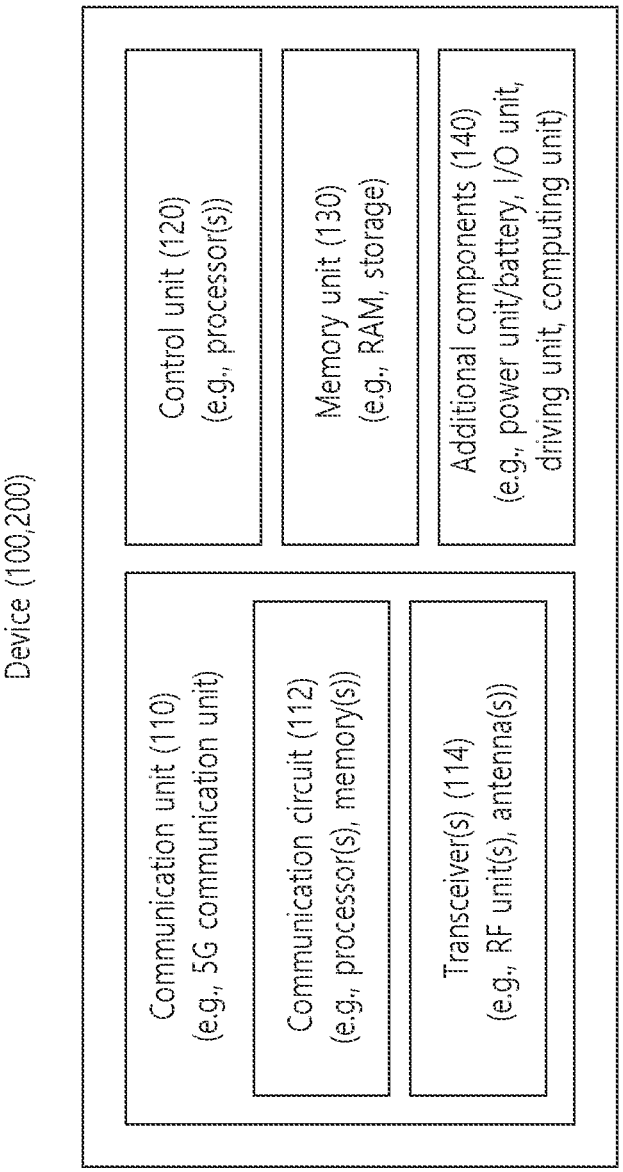
FIG. 18 illustrates another example of a wireless device applied to the disclosure.

FIG. 18 illustrates another example of a wireless device applied to the disclosure. The wireless device may be configured in various forms depending on usage/service.

Referring to FIG. 18, the wireless devices 100 and 200 may correspond to the wireless device 100 and 200 of FIG. 16 and may include various elements, components, units, and/or modules. For example, the wireless device 100 and 200 may include a communication unit 110, a control unit 120, a memory unit 130, and additional components 140. The communication unit may include a communication circuit 112 and a transceiver(s) 114. For example, the communication circuit 112 may include the at least one processor 102 and 202 and/or the at least one memory 104 and 204 of FIG. 16. For example, the transceiver(s) 114 may include the at least one transceiver 106 and 206 and/or the at least one antenna 108 and 208 of FIG. 16. The control unit 120 is electrically connected to the communication unit 110, the memory unit 130, and the additional components 140 and controls overall operations of the wireless device. For example, the control unit 120 may control electrical/mechanical operations of the wireless device on the basis of a program/code/command/information stored in the memory unit 130. In addition, the control unit 120 may transmit information stored in the memory unit 130 to the outside (e.g., a different communication device) through a wireless/wired interface via the communication unit 110 or may store, in the memory unit 130, information received from the outside (e.g., a different communication device) through the wireless/wired interface via the communication unit 110.

The additional components 140 may be configured variously depending on the type of the wireless device. For example, the additional components 140 may include at least one of a power unit/battery, an input/output (I/O) unit, a driving unit, and a computing unit. The wireless device may be configured, but not limited to, as a robot (100a in FIG. 15), a vehicle (100b-1 or 100b-2 in FIG. 15), an XR device (100c in FIG. 15), a hand-held device (100d in FIG. 15), a home appliance (100e in FIG. 15), an IoT device (100f in FIG. 15), a terminal for digital broadcasting, a hologram device, a public safety device, an MTC device, a medical device, a fintech device (or financial device), a security device, a climate/environmental device, an AI server/device (400 in FIG. 15), a base station (200 in FIG. 15), a network node, or the like. The wireless device may be mobile or may be used in a fixed place depending on usage/service.

In FIG. 18, all of the various elements, components, units, and/or modules in the wireless devices 100 and 200 may be connected to each other through a wired interface, or at least some thereof may be wirelessly connected through the communication unit 110. For example, the control unit 120 and the communication unit 110 may be connected via a cable in the wireless device 100 and 200, and the control unit 120 and a first unit (e.g., 130 and 140) may be wirelessly connected through the communication unit 110. In addition, each element, component, unit, and/or module in wireless device 100 and 200 may further include at least one element. For example, the control unit 120 may include at least one processor set. For example, the control unit 120 may be configured as a set of a communication control processor, an application processor, an electronic control unit (ECU), a graphics processing processor, a memory control processor, and the like. In another example, the memory unit 130 may include a random-access memory (RAM), a dynamic RAM (DRAM), a read-only memory (ROM), a flash memory, a volatile memory, a non-volatile memory, and/or a combination thereof.

Next, an illustrative configuration of FIG. 18 is described in detail with reference to the accompanying drawing.

Figure 19:
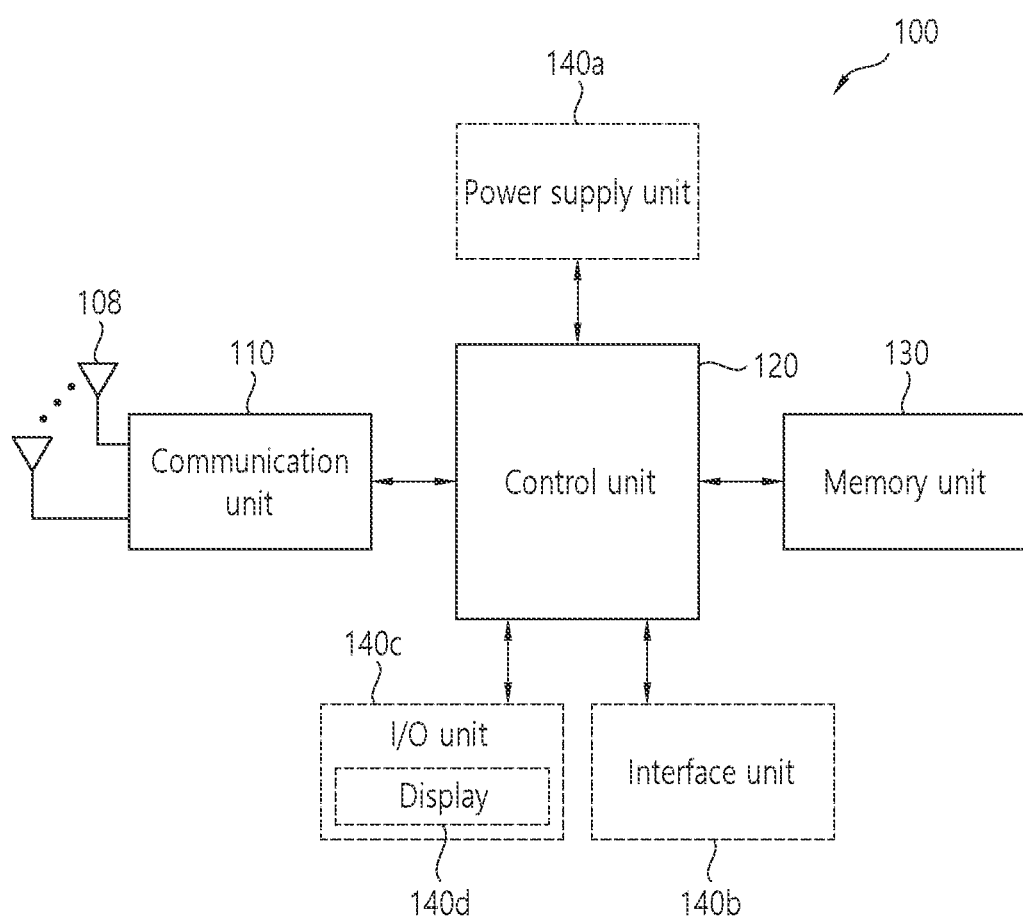
FIG. 19 illustrates a hand-held device applied to the disclosure.

FIG. 19 illustrates a hand-held device applied to the disclosure. The hand-held device may include a smartphone, a smartpad, a wearable device (e.g., a smart watch or smart glasses), and a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 19, the hand-held device 100 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. Blocks 110 to 130/140a to 140c correspond to the blocks 110 to 130/140 in FIG. 18, respectively.

The communication unit 110 may transmit and receive a signal (e.g., data, a control signal, or the like) to and from other wireless devices and base stations. The control unit 120 may control various components of the hand-held device 100 to perform various operations. The control unit 120 may include an application processor (AP). The memory unit 130 may store data/parameter/program/code/command necessary to drive the hand-held device 100. Further, the memory unit 130 may store input/output data/information. The power supply unit 140a supplies power to the hand-held device 100 and may include a wired/wireless charging circuit, a battery, and the like. The interface unit 140b may support a connection between the hand-held device 100 and a different external device. The interface unit 140b may include various ports (e.g., an audio input/output port and a video input/output port) for connection to an external device. The input/output unit 140c may receive or output image information/signal, audio information/signal, data, and/or information input from a user. The input/output unit 140c may include a camera, a microphone, a user input unit, a display unit 140d, a speaker, and/or a haptic module.

For example, in data communication, the input/output unit 140c may obtain information/signal (e.g., a touch, text, voice, an image, and a video) input from the user, and the obtained information/signal may be stored in the memory unit 130. The communication unit 110 may convert information/signal stored in the memory unit into a radio signal and may transmit the converted radio signal directly to a different wireless device or to a base station. In addition, the communication unit 110 may receive a radio signal from a different wireless device or the base station and may reconstruct the received radio signal to original information/signal. The reconstructed information/signal may be stored in the memory unit 130 and may then be output in various forms (e.g., text, voice, an image, a video, and a haptic form) through the input/output unit 140c.

Figure 20:
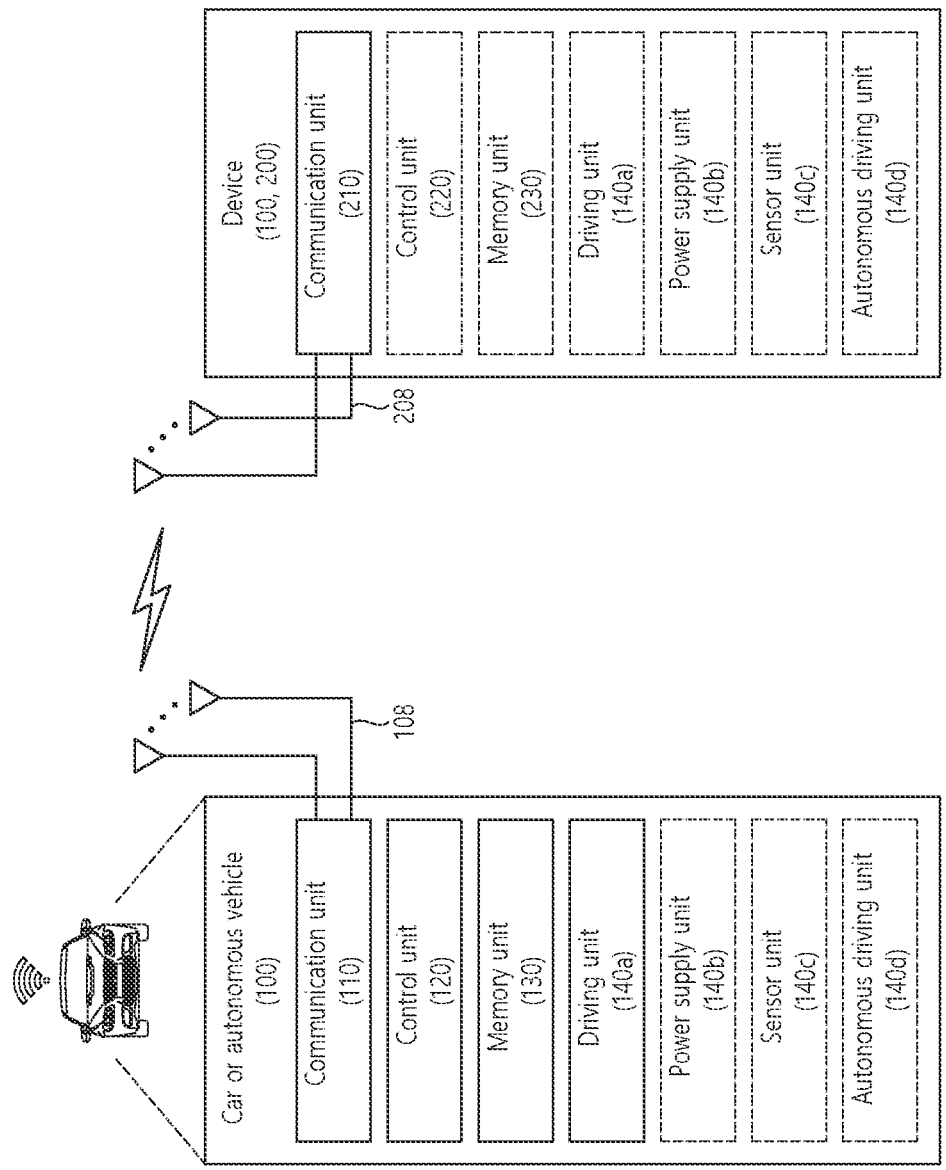
FIG. 20 illustrates a vehicle or an autonomous driving vehicle applied to the disclosure.

FIG. 20 illustrates a vehicle or an autonomous driving vehicle applied to the disclosure. The vehicle or the autonomous driving may be configured as a mobile robot, a car, a train, a manned/unmanned aerial vehicle (AV), a ship, or the like.

Referring to FIG. 20, the vehicle or the autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. Blocks 110/130/140a to 140d correspond to the blocks 110/130/140 in FIG. 18, respectively.

The communication unit 110 may transmit and receive a signal (e.g., data, a control signal, or the like) to and from external devices, such as a different vehicle, a base station (e.g. a base station, a road-side unit, or the like), and a server. The control unit 120 may control elements of the vehicle or the autonomous driving vehicle 100 to perform various operations. The control unit 120 may include an electronic control unit (ECU). The driving unit 140a may enable the vehicle or the autonomous driving vehicle 100 to run on the ground. The driving unit 140a may include an engine, a motor, a power train, wheels, a brake, a steering device, and the like. The power supply unit 140b supplies power to the vehicle or the autonomous driving vehicle 100 and may include a wired/wireless charging circuit, a battery, and the like. The sensor unit 140c may obtain a vehicle condition, environmental information, user information, and the like. The sensor unit 140c may include an inertial measurement unit (IMU) sensor, a collision sensor, a wheel sensor, a speed sensor, an inclination sensor, a weight sensor, a heading sensor, a position module, vehiclular forward/backward vision sensors, a battery sensor, a fuel sensor, a tire sensor, a steering sensor, a temperature sensor, a humidity sensor, an ultrasonic sensor, an illuminance sensor, a pedal position sensor, and the like. The autonomous driving unit 140d may implement a technology for maintaining a driving lane, a technology for automatically adjusting speed, such as adaptive cruise control, a technology for automatic driving along a set route, a technology for automatically setting a route and driving when a destination is set, and the like.

For example, the communication unit 110 may receive map data, traffic condition data, and the like from an external server. The autonomous driving unit 140d may generate an autonomous driving route and a driving plan on the basis of obtained data. The control unit 120 may control the driving unit 140a to move the vehicle or the autonomous driving vehicle 100 along the autonomous driving route according to the driving plan (e.g., speed/direction control). During autonomous driving, the communication unit 110 may aperiodically/periodically obtain updated traffic condition data from the external server and may obtain surrounding traffic condition data from a neighboring vehicle. Further, during autonomous driving, the sensor unit 140c may obtain a vehicle condition and environmental information. The autonomous driving unit 140d may update the autonomous driving route and the driving plan on the basis of newly obtained data/information. The communication unit 110 may transmit information about a vehicle location, an autonomous driving route, a driving plan, and the like to the external server. The external server may predict traffic condition data in advance using AI technology or the like on the basis of information collected from vehicles or autonomous driving vehicles and may provide the predicted traffic condition data to the vehicles or the autonomous driving vehicles.

Figure 21:
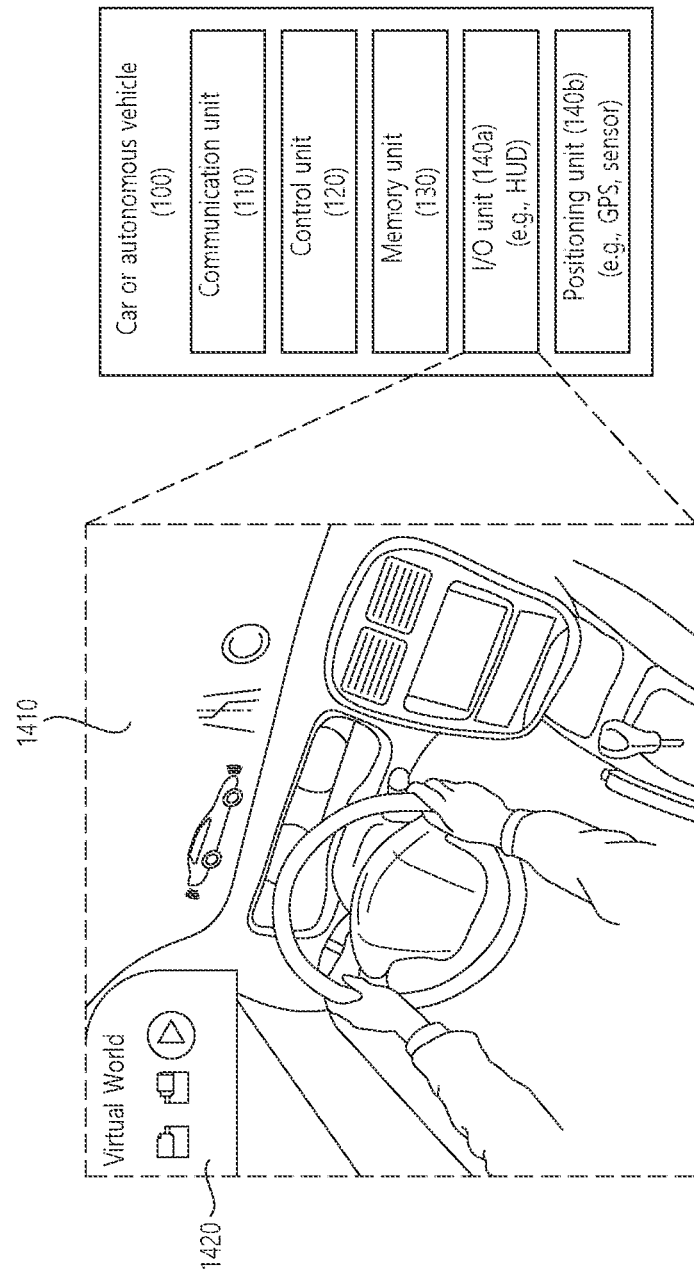
FIG. 21 illustrates a vehicle applied to the disclosure.

FIG. 21 illustrates a vehicle applied to the disclosure. The vehicle may be implemented as a means of transportation, a train, an air vehicle, a ship, and the like.

Referring to FIG. 21, the vehicle 100 may include a communication unit 110, a control unit 120, a memory unit 130, an input/output unit 140a, and a positioning unit 140b. Herein, blocks 110 to 130/140a to 140b correspond to block 110 to 130/140 of FIG. 18, respectively.

The communication unit 110 may transmit/receive signals (e.g., data, control signals, etc.) with other vehicles or external devices such as a base station. The control unit 120 may control components of the vehicle 100 to perform various operations. The memory unit 130 may store data/parameters/programs/codes/commands supporting various functions of the vehicle 100. The input/output unit 140a may output an AR/VR object based on information in the memory unit 130. The input/output unit 140a may include a HUD. The positioning unit 140b may acquire position information of the vehicle 100. The location information may include absolute location information of the vehicle 100, location information within a driving line, acceleration information, location information with a neighboring vehicle, and the like. The positioning unit 140b may include a GPS and various sensors.

For example, the communication unit 110 of the vehicle 100 may receive map information, traffic information, and the like from an external server and store it in the memory unit 130. The positioning unit 140b may obtain vehicle position information through GPS and various sensors and store it in the memory unit 130. The control unit 120 may generate a virtual object based on map information, traffic information, vehicle location information, and the like, and the input/output unit 140a may display the generated virtual object on a window inside the vehicle (1410 and 1420). In addition, the control unit 120 may determine whether the vehicle 100 is normally operating within the driving line based on the vehicle location information. When the vehicle 100 abnormally deviates from the driving line, the control unit 120 may display a warning on the windshield of the vehicle through the input/output unit 140a. Also, the control unit 120 may broadcast a warning message regarding the driving abnormality to surrounding vehicles through the communication unit 110. Depending on the situation, the control unit 120 may transmit the location information of the vehicle and information on driving/vehicle abnormality to the related organization through the communication unit 110.

Figure 22:
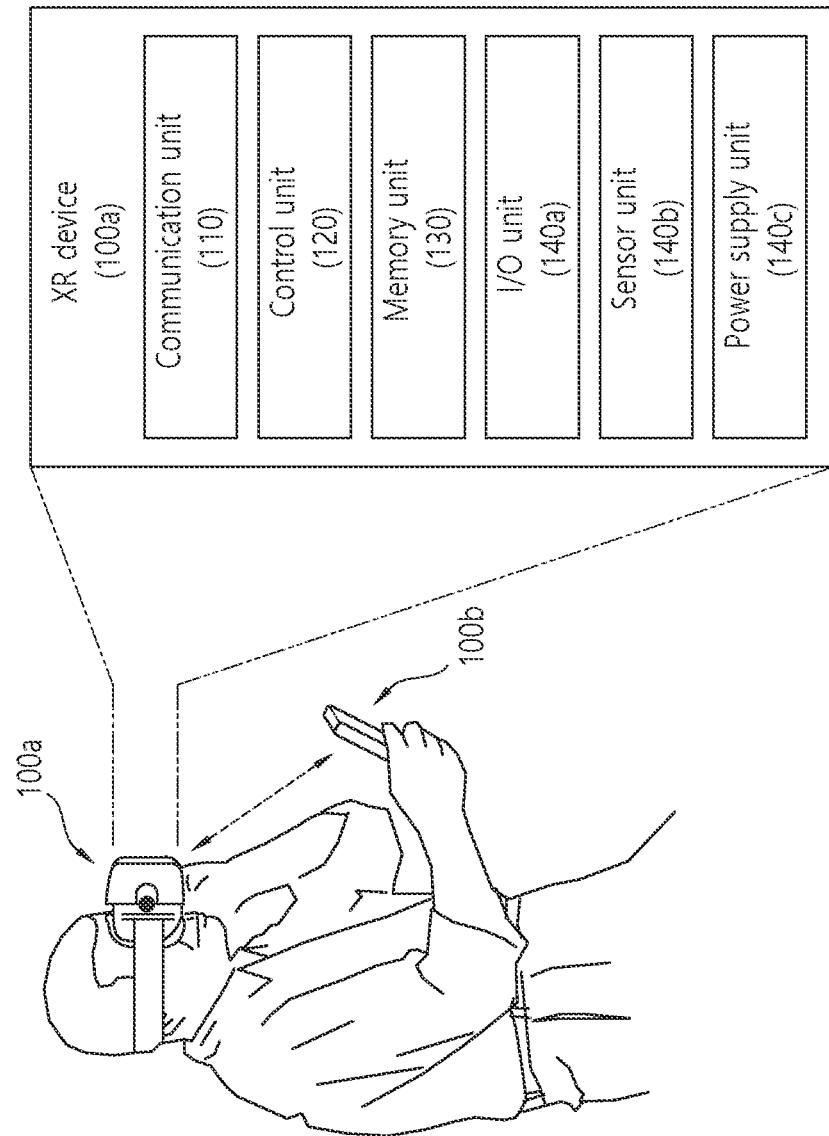
FIG. 22 illustrates a XR device applied to the disclosure.

FIG. 22 illustrates a XR device applied to the disclosure. The XR device may be implemented as an HMD, a head-up display (HUD) provided in a vehicle, a television, a smartphone, a computer, a wearable device, a home appliance, a digital signage, a vehicle, a robot, and the like.

Referring to FIG. 22, the XR device 100a may include a communication unit 110, a control unit 120, a memory unit 130, an input/output unit 140a, a sensor unit 140b and a power supply unit 140c. Herein, blocks 110 to 130/140a to 140c correspond to blocks 110 to 130/140 in FIG. 18.

The communication unit 110 may transmit/receive signals (e.g., media data, control signals, etc.) to/from external devices such as other wireless devices, portable devices, or media servers. Media data may include images, images, sounds, and the like. The control unit 120 may control the components of the XR device 100a to perform various operations. For example, the control unit 120 may be configured to control and/or perform procedures such as video/image acquisition, (video/image) encoding, and metadata generation and processing. The memory unit 130 may store data/parameters/programs/codes/commands necessary for driving the XR device 100a/creating an XR object. The input/output unit 140a may obtain control information, data, and the like from the outside, and may output the generated XR object. The input/output unit 140a may include a camera, a microphone, a user input unit, a display unit, a speaker, and/or a haptic module. The sensor unit 140b may obtain an XR device state, surrounding environment information, user information, and the like. The sensor unit 140b may include a proximity sensor, an illumination sensor, an acceleration sensor, a magnetic sensor, a gyro sensor, an inertial sensor, a RGB sensor, an IR sensor, a fingerprint recognition sensor, an ultrasonic sensor, an optical sensor, a microphone, and/or a radar. The power supply unit 140c supplies power to the XR device 100a, and may include a wired/wireless charging circuit, a battery, and the like.

For example, the memory unit 130 of the XR device 100a may include information (e.g., data, etc.) necessary for generating an XR object (e.g., AR/VR/MR object). The input/output unit 140a may obtain a command to operate the XR device 100a from the user, and the control unit 120 may drive the XR device 100a according to the user's driving command. For example, when the user wants to watch a movie or news through the XR device 100a, the control unit 120 transmits the content request information through the communication unit 130 to another device (e.g., the mobile device 100b) or can be sent to the media server. The communication unit 130 may download/stream contents such as movies and news from another device (e.g., the portable device 100b) or a media server to the memory unit 130. The control unit 120 controls and/or performs procedures such as video/image acquisition, (video/image) encoding, and metadata generation/processing for the content, and is acquired through the input/output unit 140a/the sensor unit 140b An XR object can be generated/output based on information about one surrounding space or a real object.

Also, the XR device 100a is wirelessly connected to the portable device 100b through the communication unit 110, and the operation of the XR device 100a may be controlled by the portable device 100b. For example, the portable device 100b may operate as a controller for the XR device 100a. To this end, the XR device 100a may obtain 3D location information of the portable device 100b, and then generate and output an XR object corresponding to the portable device 100b.

Figure 23:
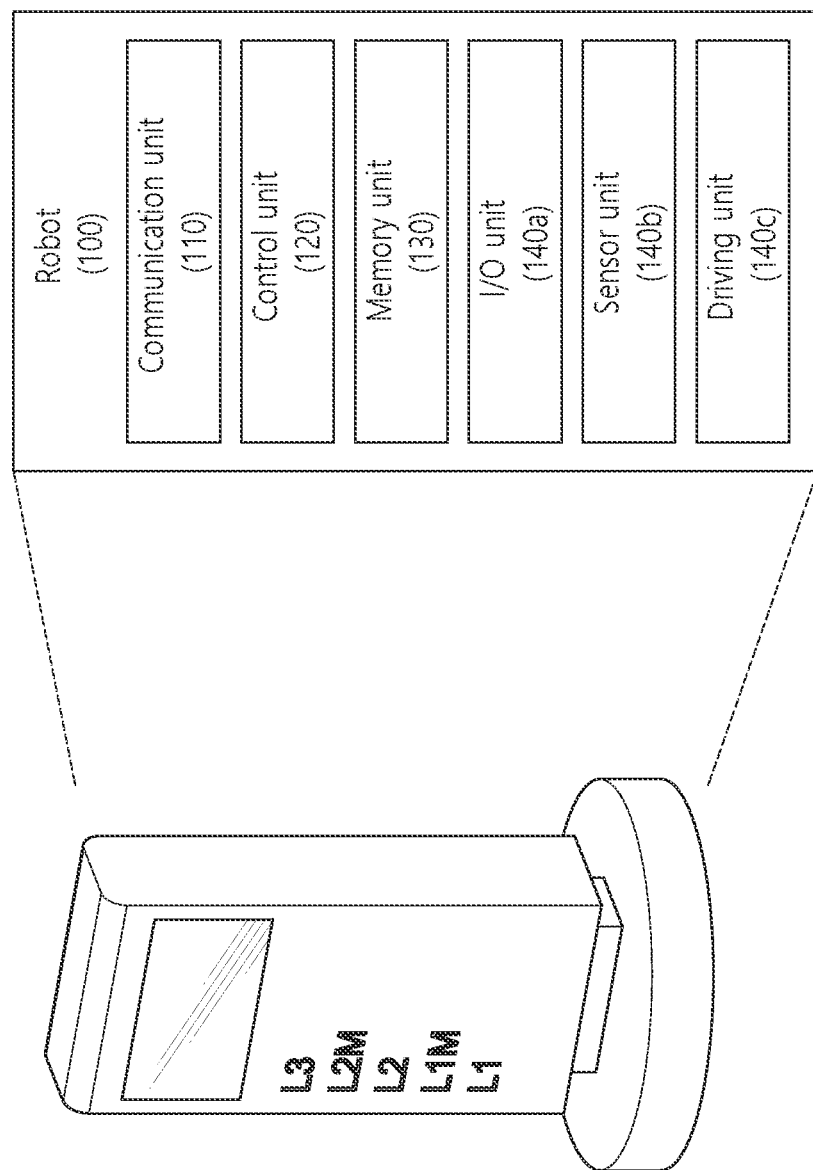
FIG. 23 illustrates a robot applied to the disclosure.

FIG. 23 illustrates a robot applied to the disclosure. The robot may be classified into industrial, medical, home, military, and the like depending on the purpose or field of use.

Referring to FIG. 23, the robot 100 may include a communication unit 110, a control unit 120, a memory unit 130, an input/output unit 140a, a sensor unit 140b, and a driving unit 140c. Herein, blocks 110 to 130/140a to 140c correspond to blocks 110 to 130/140 in FIG. 18.

The communication unit 110 may transmit/receive signals (e.g., driving information, control signal, etc.) to/from external device such as other wireless device, other robot, or a control server. The control unit 120 may perform various operations by controlling the components of the robot 100. The memory unit 130 may store data/parameters/programs/codes/commands supporting various functions of the robot 100. The input/output unit 140a may obtain information from the outside of the robot 100 and may output information to the outside of the robot 100. The input/output unit 140a may include a camera, a microphone, an user input unit, a display unit, a speaker, and/or a haptic module, etc. The sensor unit 140b may obtain internal information, surrounding environment information, user information and the like of the robot 100. The sensor unit may include a proximity sensor, an illumination sensor, an acceleration sensor, a magnetic sensor, a gyro sensor, an inertial sensor, an IR sensor, a fingerprint recognition sensor, an ultrasonic sensor, an optical sensor, a microphone, a radar, and the like. The driving unit 140c may perform various physical operations such as moving a robot joint. In addition, the driving unit 140c may make the robot 100 travel on the ground or fly in the air. The driving unit 140c may include an actuator, a motor, a wheel, a brake, a propeller, and the like.

Figure 24:
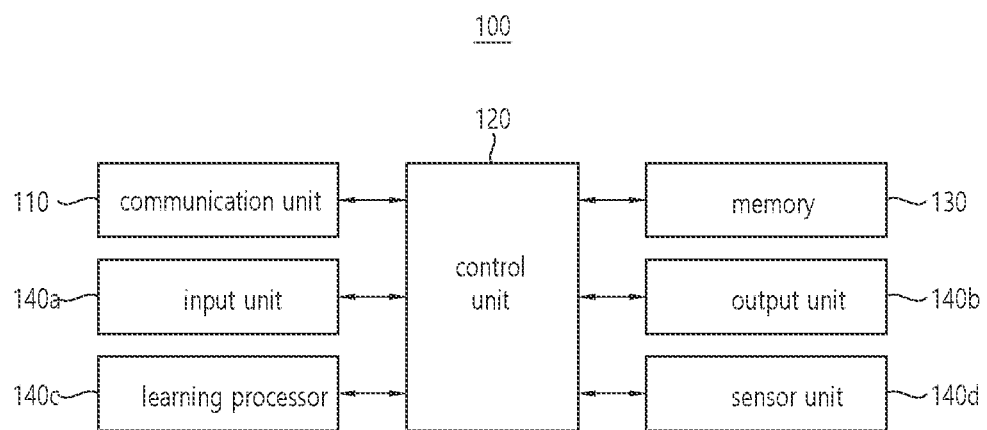
FIG. 24 illustrates an AI device applied to the disclosure.

FIG. 24 illustrates an AI device applied to the disclosure. The AI device may be implemented as a stationary device or a mobile device, such as a TV, a projector, a smartphone, a PC, a laptop, a digital broadcasting terminal, a tablet PC, a wearable device, a set-top box, a radio, a washing machine, a refrigerator, digital signage, a robot, and a vehicle.

Referring to FIG. 24, the AI device 100 may include a communication unit 110, a control unit 120, a memory unit 130, an input unit 140a, an output unit 140b, a learning processor unit 140c, and a sensor unit 140d. Blocks 110 to 130/140a to 140d correspond to the blocks 110 to 130/140 of FIG. 18, respectively.

The communication unit 110 may transmit and receive wired or wireless signals (e.g., sensor information, a user input, a learning mode, a control signal, or the like) to and from external devices, a different AI device (e.g., 100x, 200, or 400 in FIG. 15) or an AI server (e.g., 400 in FIG. 15) using wired or wireless communication technologies. To this end, the communication unit 110 may transmit information in the memory unit 130 to an external device or may transmit a signal received from the external device to the memory unit 130.

The control unit 120 may determine at least one executable operation of the AI device 100 on the basis of information determined or generated using a data analysis algorithm or a machine-learning algorithm. The control unit 120 may control components of the AI device 100 to perform the determined operation. For example, the control unit 120 may request, retrieve, receive, or utilize data of the learning processor unit 140c or the memory unit 130 and may control components of the AI device 100 to perform a predicted operation or an operation determined to be preferable among the at least one executable operation. The control unit 120 may collect history information including details about an operation of the AI device 100 or a user's feedback on the operation and may store the history information in the memory unit 130 or the learning processor unit 140c or may transmit the history information to an external device, such as the AI server (400 in FIG. 15). The collected history information may be used to update a learning model.

The memory unit 130 may store data for supporting various functions of the AI device 100. For example, the memory unit 130 may store data obtained from the input unit 140a, data obtained from the communication unit 110, output data from the learning processor unit 140c, and data obtained from the sensing unit 140. Further, the memory unit 130 may store control information and/or a software code necessary for the operation/execution of the control unit 120.

The input unit 140a may obtain various types of data from the outside of the AI device 100. For example, the input unit 140a may obtain learning data for model learning and input data to which a learning model is applied. The input unit 140a may include a camera, a microphone, and/or a user input unit. The output unit 140b may generate visual, auditory, or tactile output. The output unit 140b may include a display unit, a speaker, and/or a haptic module. The sensing unit 140 may obtain at least one of internal information about the AI device 100, environmental information about the AI device 100, and user information using various sensors. The sensing unit 140 may include a proximity sensor, an illuminance sensor, an acceleration sensor, a magnetic sensor, a gyro sensor, an inertial sensor, an RGB sensor, an IR sensor, a fingerprint sensor, an ultrasonic sensor, an optical sensor, a microphone, and/or a radar.

The learning processor unit 140c may train a model including artificial neural networks using learning data. The learning processor unit 140c may perform AI processing together with a learning processor unit of an AI server (400 in FIG. 15). The learning processor unit 140c may process information received from an external device through the communication unit 110 and/or information stored in the memory unit 130. In addition, an output value from the learning processor unit 140c may be transmitted to an external device through the communication unit 110 and/or may be stored in the memory unit 130.

The claims described herein may be combined in various ways. For example, the technical features of the method claims in the present disclosure may be combined and implemented as an apparatus, and the technical features of the device claims in the present disclosure may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

What is claimed is:

1. An uplink transmission method performed by a user equipment (UE) in a wireless communication system, the method comprising:
   receiving repetition transmission configuration information,
      wherein the repetition transmission configuration information is information for configuring repetition transmission for a physical uplink channel to the UE, and
      wherein the repetition transmission configuration information reports a plurality of time-domain resource sets in which the repetition transmission is performed; and
   performing transmission on the physical uplink channel in an actual time-domain resource set included in a specific time-domain resource set, based on that a specific resource is included in the specific time-domain resource set included in the plurality of time-domain resource sets,
      wherein a channel characteristic for time-domain resources included in the plurality of time-domain resource sets is identical,
      wherein the channel characteristic includes power and a phase,
      wherein the specific resource is a resource in which an event occurs,
      wherein the event is an operation of determining that the channel characteristic cannot be maintained,
      wherein the specific resource includes a resource in which the UE receives a timing advance TA command from a BS, and
      wherein the UE does not perform UE autonomous TA adjustment in the actual time-domain resource set.

2. The method of claim 1,
   wherein the UE determines whether to perform the UE autonomous TA adjustment, and
   wherein the UE autonomous TA adjustment is TA adjustment performed by the UE without a TA command received by the UE from a base station (BS).

3. The method of claim 2, wherein the UE does not perform the UE autonomous TA adjustment in the actual time-domain resource set, based on that the UE determines to perform the UE autonomous TA adjustment in the actual time-domain resource set.

4. The method of claim 3, wherein the UE performs the UE autonomous TA adjustment after the specific time-domain resource set.

5. The method of claim 1, wherein the physical uplink channel is at least one of a physical uplink control channel (PUCCH) and a physical uplink shared channel (PUSCH).

6. The method of claim 1, wherein the actual time-domain resource set starts from a resource immediately subsequent to the specific resource on a time domain.

7. The method of claim 1, wherein the actual time-domain resource set ends at a last resource configured as the specific time-domain resource set on a time domain or a resource immediately previous to another specific resource among resources configured as the specific time-domain resource set.

8. The method of claim 1, wherein each of the plurality of time-domain resource sets is configured repeatedly in a time domain, based on the repetition transmission configuration information.

9. A user equipment (UE) comprising:
   one or more memories storing instructions;
   one or more transceivers; and
   one or more processors coupling the one or more memories and the one or more transceivers,
   wherein the one or more processors execute the instructions to:
   receive repetition transmission configuration information,
      wherein the repetition transmission configuration information is information for configuring repetition transmission for a physical uplink channel to the UE, and
      wherein the repetition transmission configuration information reports a plurality of time-domain resource sets in which the repetition transmission is performed; and
   perform transmission on the physical uplink channel in an actual time-domain resource set included in a specific time-domain resource set, based on that a specific resource is included in the specific time-domain resource set included in the plurality of time-domain resource sets,
      wherein a channel characteristic for time-domain resources included in the plurality of time-domain resource sets is identical,
      wherein the channel characteristic includes power and a phase,
      wherein the specific resource is a resource in which an event occurs,
      wherein the event is an operation of determining that the channel characteristic cannot be maintained,
      wherein the specific resource includes a resource in which the UE receives a timing advance (TA) command from a BS, and
      wherein the UE does not perform UE autonomous TA adjustment in the actual time-domain resource set.

10. An apparatus configured to control a user equipment (UE), the apparatus comprising:
   one or more processors; and
   one or more memories operatively coupled by the one or more processors and storing instructions, wherein the one or more processors execute the instructions to:

receive repetition transmission configuration information,
   wherein the repetition transmission configuration information is information for configuring repetition transmission for a physical uplink channel to the UE, and
   wherein the repetition transmission configuration information reports a plurality of time-domain resource sets in which the repetition transmission is performed; and perform transmission on the physical uplink channel in an actual time-domain resource set included in a specific time-domain resource set, based on that a specific resource is included in the specific time-domain resource set included in the plurality of time-domain resource sets,
   wherein a channel characteristic for time-domain resources included in the plurality of time-domain resource sets is identical,
   wherein the channel characteristic includes power and a phase,
   wherein the specific resource is a resource in which an event occurs,
   wherein the event is an operation of determining that the channel characteristic cannot be maintained,
   wherein the specific resource includes a resource in which the UE receives a timing advance (TA) command from a BS, and
   wherein the UE does not perform UE autonomous TA adjustment in the actual time-domain resource set.

* * * * *